United States Patent
Mogan et al.

(10) Patent No.: US 9,164,594 B2
(45) Date of Patent: Oct. 20, 2015

(54) METHOD AND APPARATUS FOR SENSING SPONTANEOUS CHANGES IN A LOCALIZED ELECTROMAGNETIC FIELD AND METHOD FOR USE

(76) Inventors: Barnabas Mogan, Centerville, VA (US); Don S. Hutcheson, Severna Park, MD (US)

( * ) Notice: Subject to any disclaimer, the term of this patent is extended or adjusted under 35 U.S.C. 154(b) by 243 days.

(21) Appl. No.: 13/700,101

(22) PCT Filed: May 26, 2011

(86) PCT No.: PCT/US2011/038237
§ 371 (c)(1),
(2), (4) Date: Apr. 22, 2013

(87) PCT Pub. No.: WO2011/150276
PCT Pub. Date: Dec. 1, 2011

(65) Prior Publication Data
US 2013/0249794 A1    Sep. 26, 2013

Related U.S. Application Data

(60) Provisional application No. 61/348,633, filed on May 26, 2010.

(51) Int. Cl.
G09G 5/00       (2006.01)
G06F 3/033     (2013.01)
G01V 9/00       (2006.01)

(52) U.S. Cl.
CPC ............... *G06F 3/033* (2013.01); *G01V 9/002* (2013.01)

(58) Field of Classification Search
CPC .......... G06F 3/033; G06F 3/0227; G06F 3/02; G06F 3/0213
USPC .................................................. 345/156–169
See application file for complete search history.

(56) References Cited

U.S. PATENT DOCUMENTS

| | | | |
|---|---|---|---|
| 6,980,181 B2* | 12/2005 | Sudo | 345/82 |
| 2005/0215842 A1* | 9/2005 | Pilla et al. | 600/9 |
| 2009/0153487 A1* | 6/2009 | Gunther et al. | 345/168 |
| 2011/0221678 A1* | 9/2011 | Davydov | 345/168 |

* cited by examiner

*Primary Examiner* — Jennifer Nguyen
(74) *Attorney, Agent, or Firm* — J. Andrew McKinney, Jr.; McKinney & Associates, LLC

(57) ABSTRACT

A system 300 for sensing spontaneous or localized changes in an electromagnetic field and generating an indication in response comprises an EMF change sensor 320 configured to sense a momentary and localized change in an ambient electromagnetic field and generate an EMF change detection signal in response. An electromagnetic peripheral adapter or EMF typewriter interface circuit 330 is configured to detect the EMF change detection signal generates a selected plurality of momentary communication state-change signals and a mouse signal encoded for communication with a computer 350 which is programmed to generate momentary communication prompts for playback or display and to receive the EMF typewriter Pointer signal. The computer 350 is also programmed to correlate each momentary communication state-change signal encoded in the EMF typewriter Pointer signal with a momentary communication prompt to identify a sensed indicia or command from the EMF change detection signal and to display a command.

13 Claims, 22 Drawing Sheets

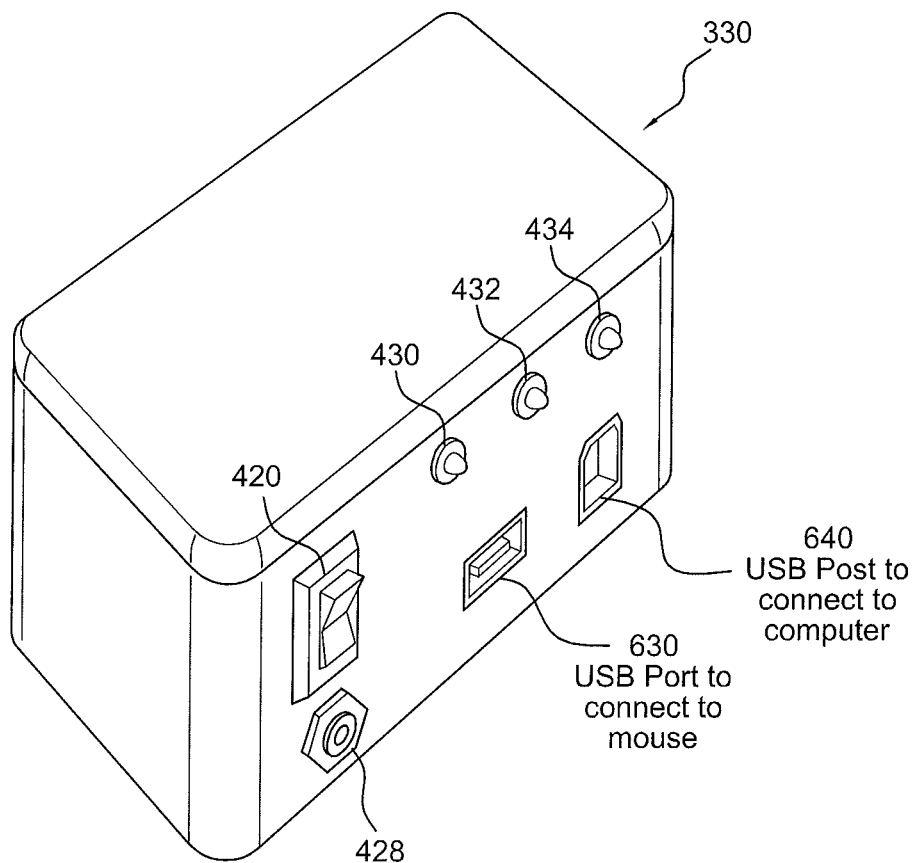
FIG. 8
2nd Embodiment
(Different in that any normal/standard mouse can connect to EMF Typewriter)
Requires:
USB cable
Mouse
Battery
Optional:
AC Adapter
Device requiring battery and having USB Ports-
AC Adapter option-
Device with battery only, requiring regular mouse, and USB cable EMF Meter: detects electro-magnetic fields and sends signal to line 1-4

EMF Adapter: interfaces EMF Meter with computer mouse

EMF Adapted Computer Mouse: interfaces EMF adapter to computer by receiving signals to control mouse in order to control computer program

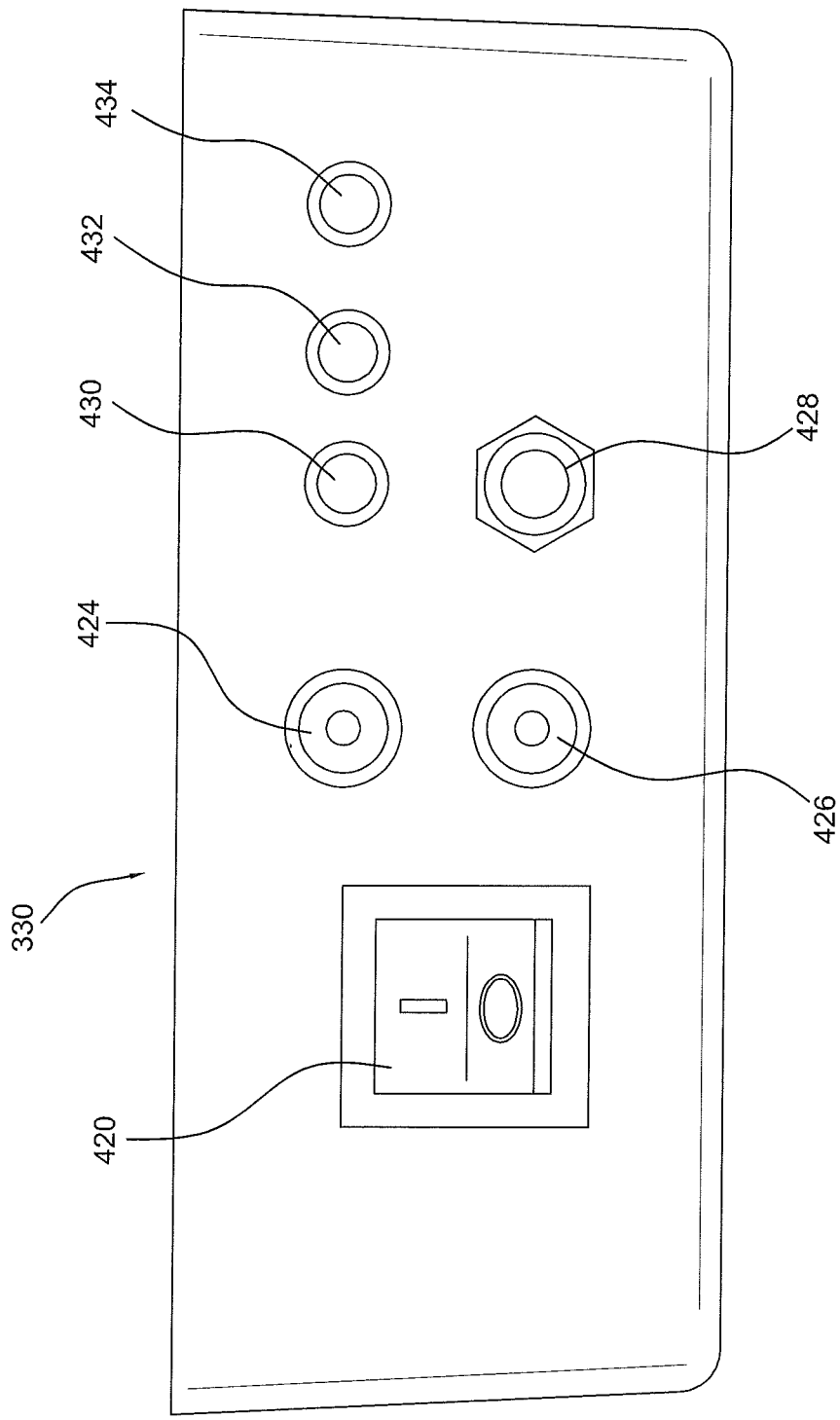

Other adaptations of this invention include, but not limited to:
a toy car which moves when an EMF field is present
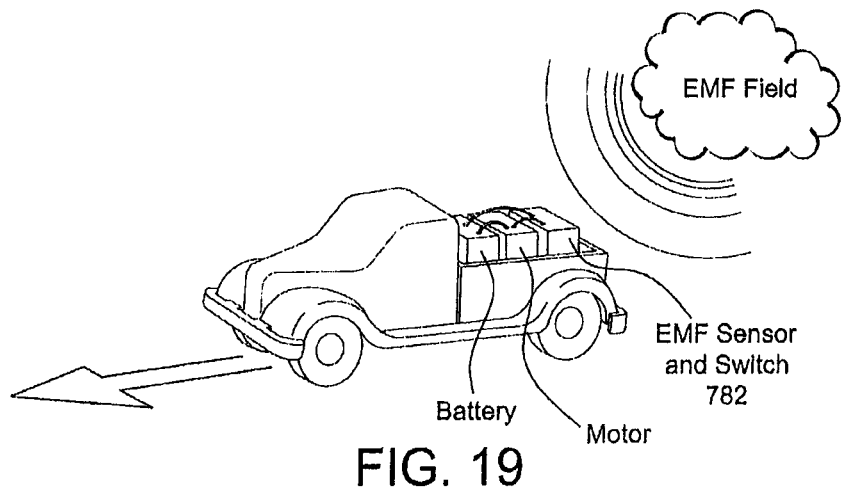
FIG. 19
a camera activated by the presence of an electromagnetic field
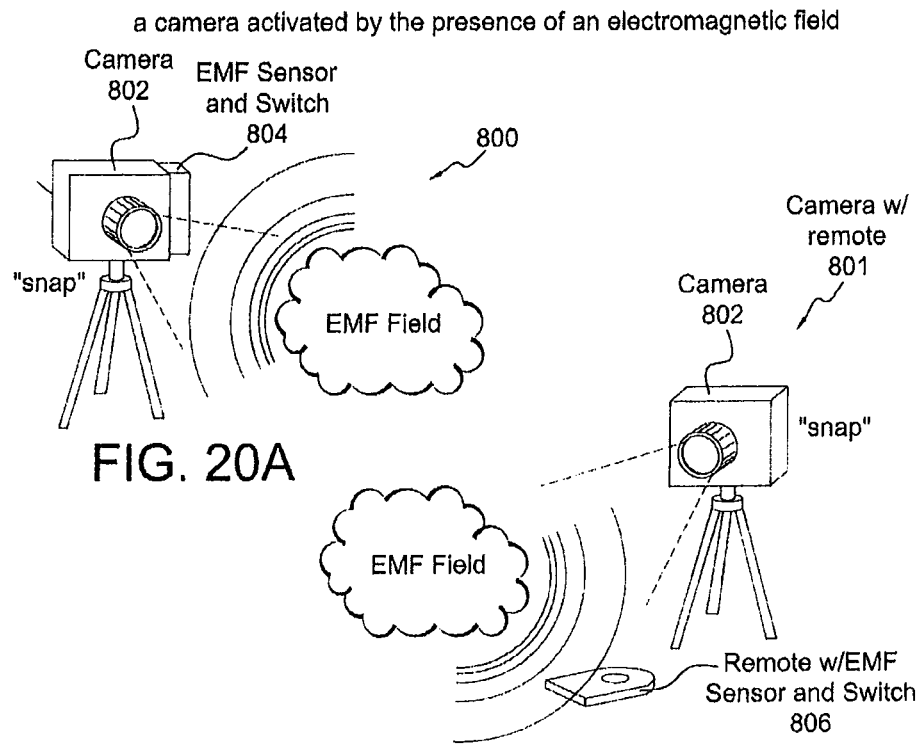
FIG. 20A
FIG. 20B

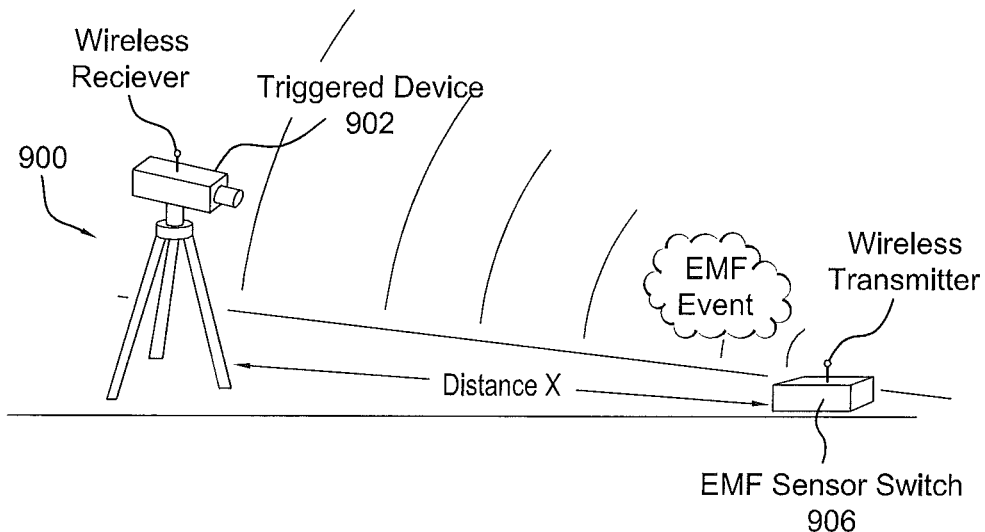

1. Connect Triggered Device to EMF Sensor Switch
   A. Audio
   B. Video (Full Spectrum, IR, Visible Spectrum)
   C. Camera
   D. EMF Recorder
   E. EMF-Sidereal Invention 1A. Wireless- Check Connection 2. Turn on EMF Sensor Switch (ARM)
   A. Light ON 4 Seconds
   B. Light OFF 3. EMF Detection Threshold Met 4. Switch Sends Signal to Triggered Device Triggered Device Control Option
{
 A. Device Remains ON
 B. Device Remains ON for Period of Time
 C. Device Triggered Once
}

FIG. 20C

METHOD AND APPARATUS FOR SENSING SPONTANEOUS CHANGES IN A LOCALIZED ELECTROMAGNETIC FIELD AND METHOD FOR USE

PRIORITY CLAIMS AND REFERENCE TO RELATED APPLICATIONS

This application claims priority to related and commonly owned U.S. provisional patent application No. 61/348,633, filed May 26, 2010, the entire disclosure of which is incorporated herein by reference.

BACKGROUND OF THE INVENTION

1. Field of the Invention

The present invention relates to methods and apparatus for sensing localized electromagnetic phenomena.

2. Discussion of Related Art

People with interest in paranormal activities have found a number of ways to satisfy their interest and amuse themselves and their friends. The traditional Ouija® board includes, typically, a game board and a planchette or pointer which moves to printed indicia and identifies individual letters or symbols which, when accumulated in a sequence, may be examined for amusing or communicative outcomes.

Other forms of amusing communication devices and wireless communication apparatus permit unseen people to send signals over a distance or through barriers so that those signals can be received and interpreted as part of an activity designed to communicate a message or the like. But traditional wireless telegraphy and the equipment customarily employed in the operation of amateur radio equipment is expensive, complicated to set up, and typically requires one or more of the participants to have an actual license from the Federal Communications Commission (FCC) and so this equipment is typically not available to the lay-person seeking to find a diversion or amusement.

There is a need, therefore, for a simpler, less expensive and less technically demanding way to permit users to engage in pastimes involving communicating with or receiving data telemetry from unseen senders.

SUMMARY OF THE INVENTION

The method and apparatus of the present invention provide a substantial improvement over the traditional Ouija® or spirit board game.

In a first embodiment, the apparatus of the present invention includes a display such as a liquid crystal display (LCD) configured to display letters one at a time. This display is connected to (or configured to respond to) a sensor configured to sense an electromagnetic phenomenon which is timed to correspond with the display of a letter to be selected. Thus, the method of the present invention resembles a solution to the "shut-in syndrome", wherein a person who is attempting to communicate or send a message blinks or makes some small movement or gesture in response to a partner's selection of a specific letter, number, symbol or other indicia, thereby affirming that the selected indicia is to be next in a sequence of communication.

The $1^{st}$ embodiment apparatus preferably includes a computer or controller for use with the display, and the controller can be used to select the indicia to be displayed from a selected set. Typically, the selected set of indicia will include, at a minimum, the entire alphabet, numerals 0-9, and may optionally include the standard typographical symbols from the standard "QWERTY" keyboard. The sensor is also optionally connectable to and controllable by the controller and is configured to sense momentary changes in a localized Electro-Magnetic Field ("EMF"). A kit which includes the foregoing components can also include a magnetic field generating planchette or magnetic pointer which includes, for example a magnet or other EMF generating element, for manipulation or use by a sender or unseen user who desires to send a message.

In accordance with the method of the invention for this embodiment, a first user begins a communication session by displaying a sequence or pattern of letters on the display, and when the LCD display shows a given letter that is deemed appropriate or correct by the second user or sender, the sender moves, actuates or enables the magnetic pointer and an Electra-Magnetic Field ("EMF") spike is caused by the magnetic pointer (or other EMF source). The EMF sensor is configured to detect a momentary change in the presence or actuation of the magnetic pointer and thus detects that the EMF spike has occurred at a time when the given letter is displayed and that letter is thus "indicated". Once the given letter has been indicated, it is recorded (e.g., in the controller's memory) as part of a communication sequence from the unseen sender.

The EMF sensor is preferably configured as a "Gauss Meter" in handheld, battery powered form. An example of an appropriate gauss meter would be the K2™ Gauss Meter which is configured to sense a change in magnetic field and provide a visible indication of that change in either a changed response from an analog meter or by changing the display indicated from an array of Light Emitting Diodes (LED) elements that are aligned along an axis and in selected colors to graphically illustrate increasing or decreasing magnetic field strength in the presence of the Gauss Meter.

In a second embodiment of the method and apparatus of the present invention, a typewriter-style board includes printed indicia with cutouts of letters, numbers and other symbols. Each indicia has a designated indicator such as a light or LED. Each indicia's light is attached to a dedicated EMF sensor. By using the magnetic pointer or other EMF source, a given letter may be selected by the user during communication. When the letter or other character is selected, that letter or character is displayed by illumination of the dedicated indicator light and the letter's selection or indication is recorded in memory as part of a communication sequence. Preferably, in this second embodiment, the communication sequence is stored in memory and displayed on a video monitor or Liquid Crystal Display.

The 2nd embodiment apparatus preferably includes a computer or controller for use with the typewriter-style board and its indicia-specific display indicators, and is also connected or connectable to each of the corresponding indicia-specific dedicated sensors which sense momentary changes in a localized Electro-Magnetic Field ("EMF"). A kit which includes the foregoing components can also include a magnetic field generating planchette or magnetic pointer which includes, for example a magnet or other EMF generating element, for use by a sender or unseen user who desires to send a message.

In another embodiment of the method and apparatus of the present invention, an unseen first user or "sender" using a wand (e.g. carrying a magnet or other source of magnetic flux) moves, points or actuates the wand (or other EMF source) without speaking and engages in a sequence of control steps. The EMF sensor (e.g., a Gauss Meter) is configured to sense momentary changes in the position of the EMF source and, in response, provides specific control actuations, thereby permitting the sender in control of the EMF source to "Play". In a game entitled "Ghost Toys" the method of the present invention permits the user of the EMF source to send or provide indications to the EMF sensor, indicating different states of control, during play. The pre-defined states of control indicated for use during play preferably include "On", "Off", "Right", "Left", "Up" and "Down". In this way the sender or user of the EMF source may provide an electromagnetic indication which is sensed by the Gauss Meter or other EMF sensor so that, in response, a second user or receiving game player may respond to the control messages when soundlessly delivered by the sending user in control of the EMF source or wand.

In yet another embodiment of the present invention, a game entitled "EMF Voice Meter" is played with a computer or controller programmed to synthesize vocal responses so that a first EMF source change, sensed by the EMF sensor corresponds to "Yes" (indicated by a green light) or "No" (indicated by a red light) where, in addition to the green and red lights, the voice synthesizer plays back a reproduced recording or synthesized audio playback signal corresponding to the words "Yes" and "No". Preferably, the system is programmed with multiple voices for an adult man, an adult woman, a youthful girl, and a youthful boy. By using first and second EMF sensors or Gauss meters located in spatially separated or orthogonally aligned positions, "yes" or "no" responses may be recorded in connection with an activity where a series of questions are asked. In a preferred embodiment of the system for this game, a voice recording system with a microphone and data storage is used to record a questioner's questions and the synthesized responses from the EMF voice meter are recorded in sequence so that a transcript of questions and answers can be prepared.

More general applications are contemplated. The apparatus method of the present invention are also likely to be helpful in situations where limited communications are possible because voice and physical movement are limited or nonexistent, but changes in a localized electromagnetic field can be measured.

By using a Gauss meter as a binary indicator and by connecting an electronic display or message board configured to receive signals from the Gauss meter, it is possible to display characters or other indicia corresponding to the sender's responses. Selection of characters is made when a sender or EMF signal generating user (e.g., carrying a magnetic pointer or wand with a magnet) momentarily alters or affects the normal, ambient electromagnetic field and that momentary EMF change is sensed with the Gauss meter (or with a spatially arrayed plurality of meters), thereby providing communication without requiring speech or physical presence or visible input from the sender.

When the user or sender seeking to communicate soundlessly sees a sequence or stream of letters of the alphabet or other indicia on an electronic sign, message board or display screen, the sender monitors the sequence and simply waits for the correct letter or indicia to be identified in the display. The sender then actuates or influences the electromagnetic field in the presence of the Gauss sensor or sensors until the actuation is sensed and the selected letter is indicated or a return code is selected. This display-select-sense process is repeated until a given communication message is complete. Alternatively, the sender can continue to indicate control responses or yes or no answers.

Applicants have noted that electric signals generated within and interpreted by the human brain are measurable by means of Electroencephalogram (EEG) sensors, thereby making it possible to directly sense electromagnetic fields generated in the brain. Applicants are also contemplating mechanisms whereby the human body can be adapted for use as an antenna or aerial which is configured for use to transmit and receive energy for the purpose of communicating through the surrounding environment.

The above and still further objects, features and advantages of the present invention will become apparent upon consideration of the following detailed description of a specific embodiment thereof, particularly when taken in conjunction with the accompanying drawings, wherein like reference numerals in the various figures are utilized to designate like components.

DESCRIPTION OF THE FIGURES

FIG. 8 is a perspective view illustrating a USB-port alternative embodiment of the EMF typewriter adapter of FIG. 3, in accordance with the present invention.

FIG. 17 is a front elevation view illustrating the EMF typewriter adapter of FIGS. 3 and 4, in accordance with the present invention.

FIG. 19 illustrates a system and method for controlling a toy car which is triggered by detection of a momentary and localized change in an ambient electromagnetic field, in accordance with the present invention.

FIG. 20A illustrates a system and method for controlling a camera (or a local image generating instrument) which is triggered by detection of a momentary and localized change in an ambient electromagnetic field in an area covered by the camera.

FIG. 20B illustrates a system and method for controlling a camera (or a local or remote image generating instrument) which is triggered by detection of a momentary and localized change in an ambient electromagnetic field in an area covered by the camera using separable EMF sensor and switch.

FIG. 20C illustrates a system and method for controlling a camera (or image generating instrument) which is triggered by detection of a momentary and localized change in an ambient electromagnetic field sensed by an EMF sensor and switch or actuator sited in an observed area covered by the camera, in accordance with the present invention.

DESCRIPTION OF THE PREFERRED EMBODIMENT

Figure 1:
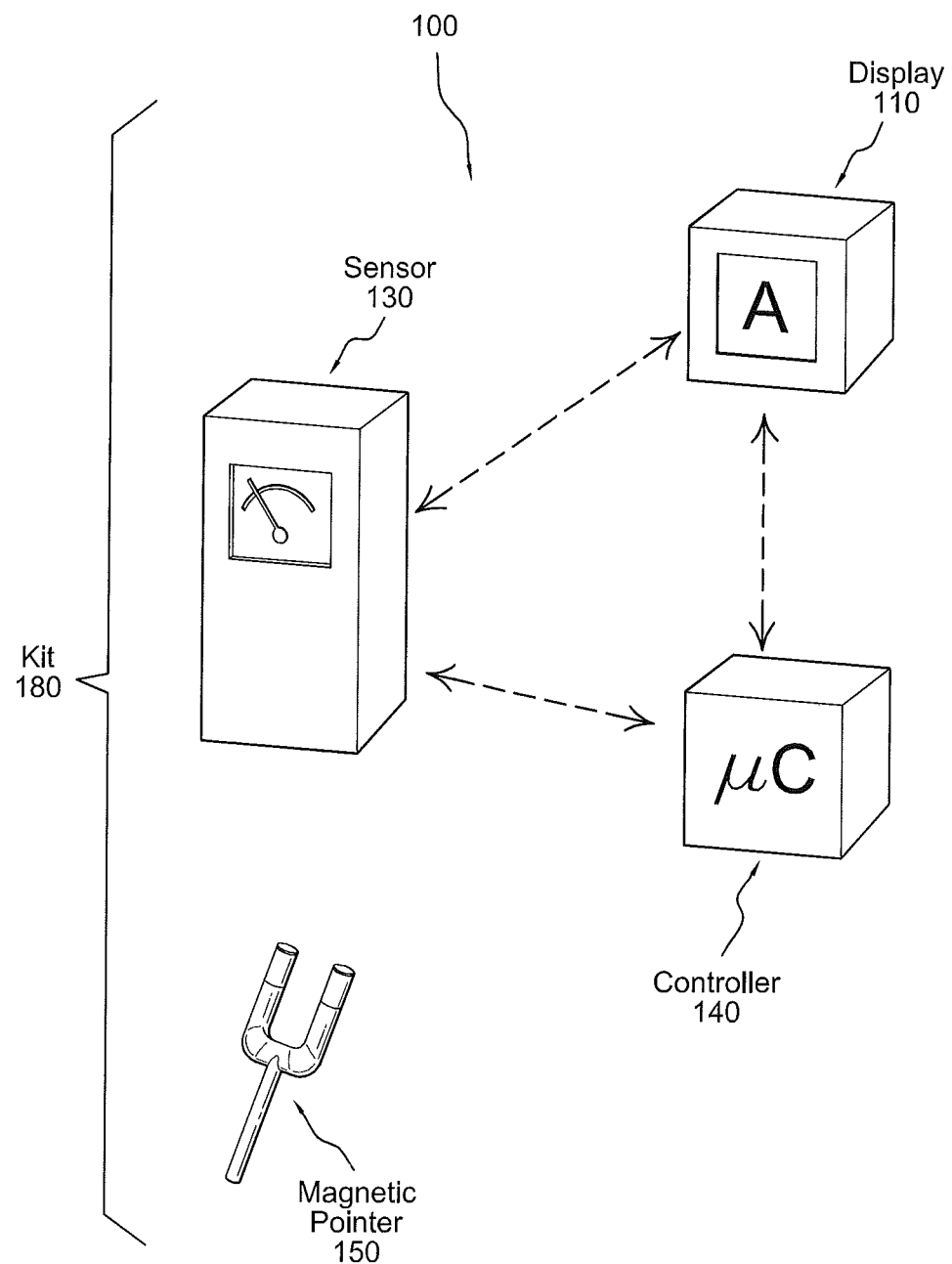
FIG. 1 is a schematic diagram illustrating a first exemplary embodiment of a sensing and display system, in accordance with the present invention.

Referring initially to FIG. 1, in the first embodiment, the system of the present invention 100 includes a display 110 such as a liquid crystal display (LCD) configured to display letters one at a time. This display is connected to (or configured to respond to) a sensor 130 configured to sense an electromagnetic phenomenon which is timed to correspond with the display of a letter to be selected. Thus, the method of the present invention resembles a solution to the "shut-in syndrome", wherein a person who is attempting to communicate or send a message blinks or makes some small movement or gesture in response to a partner's selection of a specific letter, number, symbol or other indicia, thereby affirming that the selected indicia is to be next in a sequence of communication.

The first embodiment apparatus preferably includes a computer or controller 140 for use with the display 110, and the controller 140 can be used to select the indicia to be displayed from a selected set. Typically, the selected set of indicia will include, at a minimum, the entire alphabet, numerals 0-9, and may optionally include the standard typographical symbols from the standard "QWERTY" keyboard. The sensor is also optionally connectable to and controllable by the controller and is configured to sense momentary changes in a localized Electro-Magnetic Field ("EMF"). A kit 180 which includes the foregoing components can also include a magnetic field generating planchette or magnetic pointer 150 which includes, for example a magnet or other EMF generating element, for manipulation or use by a sender or unseen user who desires to send a message.

In accordance with the method of the invention for the embodiment of FIG. 1, a first user begins a communication session by displaying a sequence or pattern of letters on the display 110, and when the LCD display shows a given letter that is deemed appropriate or correct by the second user or sender, the sender moves, actuates or enables the magnetic pointer 150 and an Electro-Magnetic Field ("EMF") spike is caused by the magnetic pointer (or other EMF source) 150. The EMF sensor 130 is configured to detect a momentary change in the presence or actuation of magnetic pointer 150 and thus detects that the EMF spike has occurred at a time when the given letter is displayed and that letter is thus "indicated". Once the given letter has been indicated, it is recorded (e.g., in the controller's memory) as part of a communication sequence from the unseen sender.

The EMF sensor 130 is preferably configured as a "Gauss Meter" in handheld, battery powered form. An example of an appropriate gauss meter would be the K2™ Gauss Meter which is configured to sense a change in magnetic field and provide a visible indication of that change in either a changed response from an analog meter or by changing the display indicated from an array of Light Emitting Diodes (LED) elements that are aligned along an axis and in selected colors to graphically illustrate increasing or decreasing magnetic field strength in the presence of the Gauss Meter.

Second Embodiment

EMF Typewriter-Style

Figure 2:
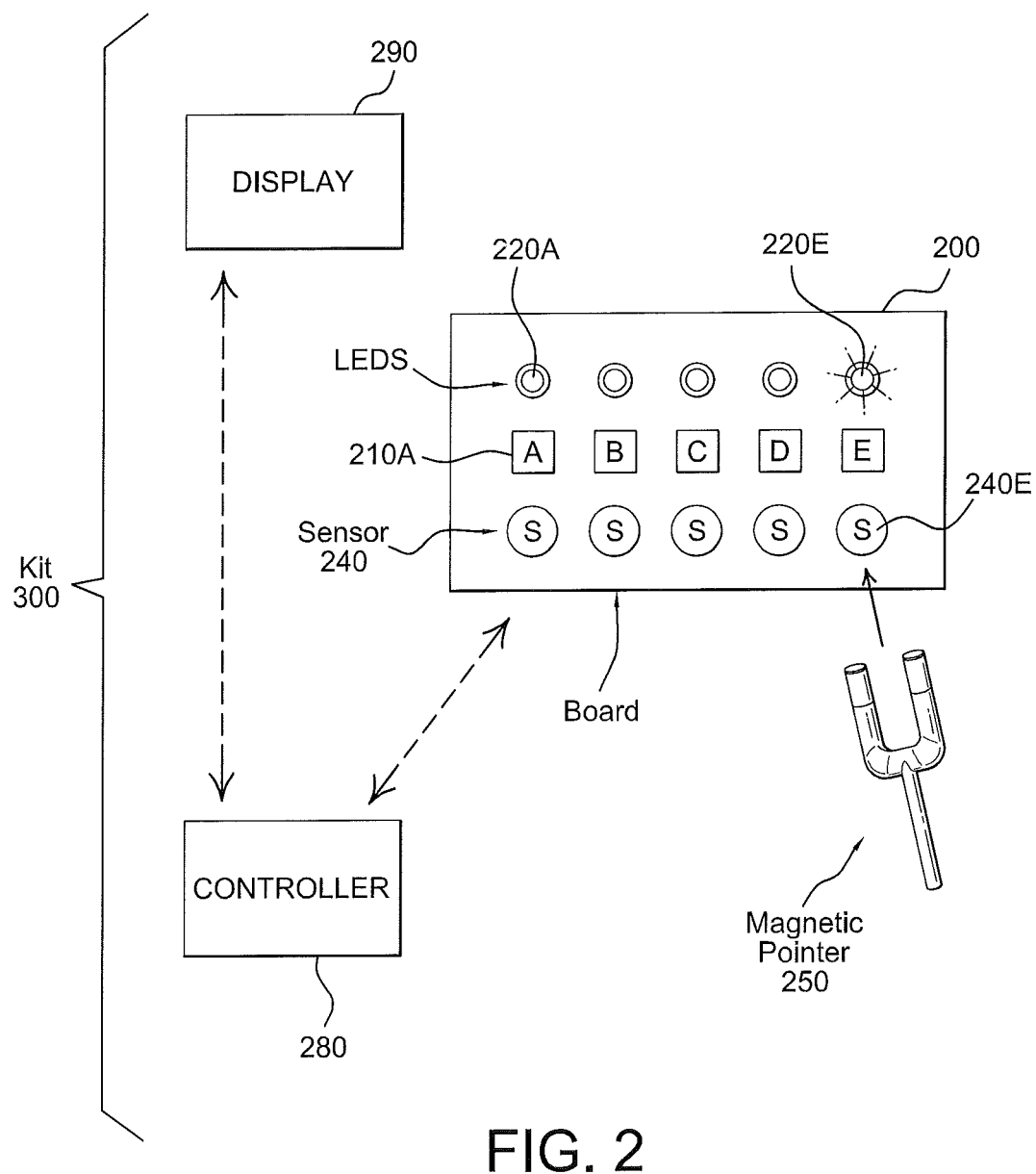
FIG. 2 is a schematic diagram illustrating a second exemplary embodiment of a sensing and display system, in accordance with the present invention.

In a second embodiment of the method and apparatus of the present invention illustrated in FIG. 2, a typewriter-style board 200 includes printed indicia (e.g., 210A, 210B and 210E), with cutouts of letters, numbers and other symbols. Each indicia has a designated indicator such as a light or LED (e.g., 220A). Each indicia's light is attached to or responsive to a dedicated EMF sensor (e.g., 240A). By using the magnetic pointer or other EMF source 250, a given letter (such as "E") may be selected by the sending user during communication. When the given letter or other character is selected, that letter or character is displayed by illumination of the dedicated indicator light (e.g., 220E) and the letter's selection or indication is recorded in memory as part of a communication sequence. Preferably, in this second embodiment, the communication sequence is stored in memory and displayed on a video monitor or Liquid Crystal Display 290.

The 2nd embodiment apparatus preferably includes a computer or controller 280 for use with the typewriter-style board 200 and its indicia-specific display indicators, and is also connected or connectable to each of the corresponding indicia-specific dedicated sensors which sense momentary changes in a localized Electro-Magnetic Field ("EMF"). A kit 300 which includes the foregoing components can also include a magnetic field generating planchette or magnetic pointer 250 which includes, for example a magnet or other EMF generating element, for use by a sender or unseen user who desires to send a message. A kit could also be configured from the components developed for the newer embodiments illustrated in FIGS. 3-18 and described below.

Figure 3:
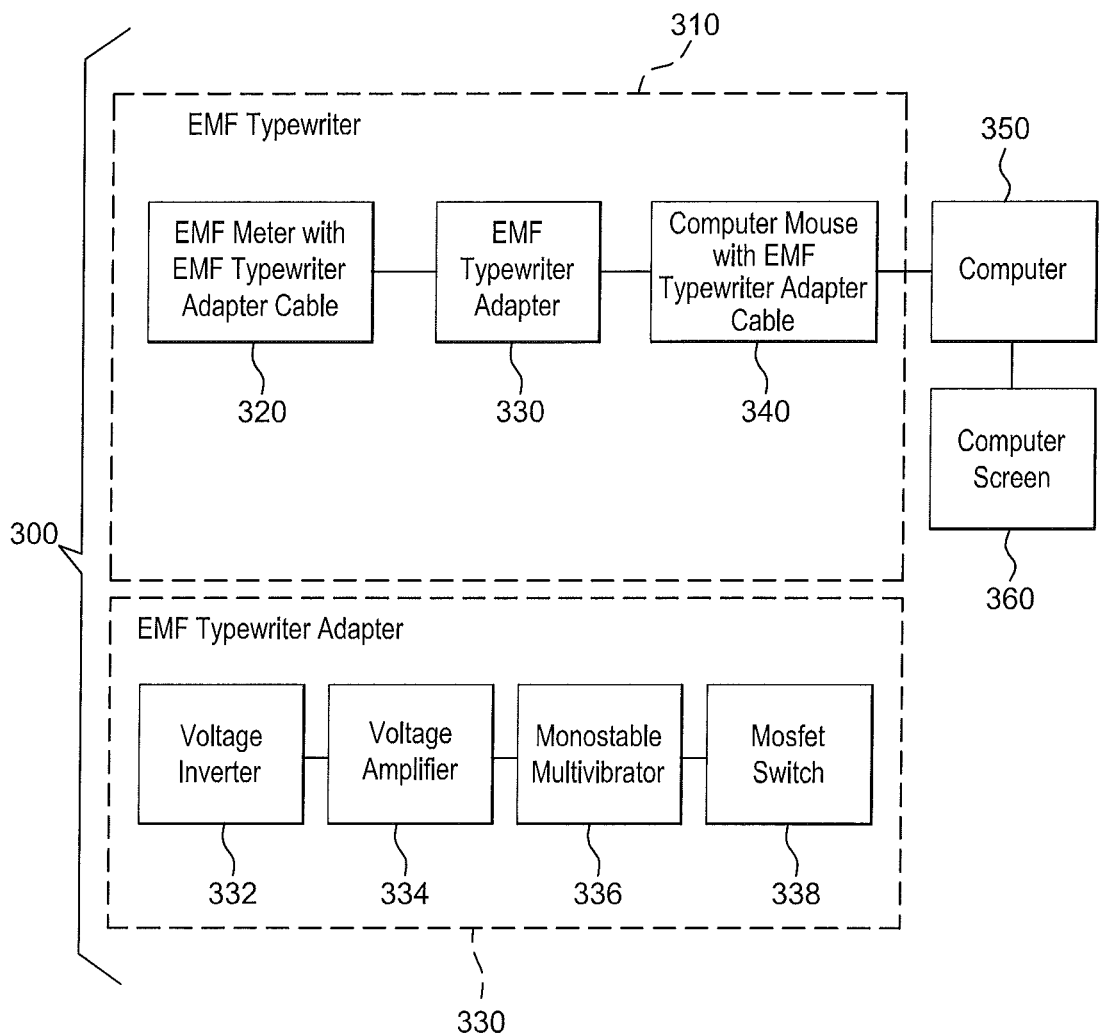
FIG. 3 is a block diagram illustrating the system for sensing spontaneous changes in a localized electromagnetic field for use with the method of the present invention.

FIGS. 3-18 illustrate newer and alternative embodiments of the system of the present invention. FIG. 3 is a block diagram illustrating the system 300 for sensing spontaneous changes in a localized electromagnetic field for use with the method of the present invention. The main component of the system of the present invention is the EMF typewriter 310 which includes an EMF meter or Gauss meter 320 configured with an EMF typewriter adaptor cable which is connected to the EMF typewriter adaptor 330. EMF meter 320 is a sensor configured to sense a momentary and localized change in an ambient electromagnetic field and generate an EMF change detection signal in response thereto. That EMF change detection signal is communicated to the EMF typewriter adaptor or interface 330 which may alternately be referred to as an electromagnetic peripheral adaptor 330. The EMF typewriter adaptor 330 is configured to detect an EMF change detection signal from the EMF sensor 320 and generates a selected plurality of momentary communication state-change signals and an EMF typewriter pointer signal encoded for communication with a computer 350.

In the illustrated embodiment, EMF typewriter adaptor 330 is connected to a modified computer mouse (or track ball or other pointing device) 340 which is configured with an EMF typewriter adaptor cable 530 so that the computer mouse or pointer 340 receives the momentary communication state change signals and EMF typewriter pointer signal from the EMF typewriter adaptor 330, as explained and illustrated further below. Computer 350 is programmed to generate a selected sequence of momentary communication prompts for playback or display (e.g. thru computer monitor 360) and to receive the EMF type writer pointer signal. Computer 350 is also programmed to correlate a momentary communication state-change signal encoded in the EMF typewriter pointer signal with a momentary communication prompt displayed on display 360 to identify a sensed indicia or command from the EMF change detection signal indicating a sensed momentary and localized change in the ambient electromagnetic field. Computer 350 is also programmed to record and display indicia or characters such as alphabetic characters or execute menu commands on the computers for display on screen 360. The programming for displaying characters as prompts and sensing changes in the EMF field will be explained further, below, in connection with FIGS. 10-14.

Returning to FIG. 3, the EMF typewriter adaptor 330 is illustrated schematically and includes a voltage inverter configured to receive the EMF change detection signal from sensor 320; the inverted detection signal is then provided to a voltage amplifier 334 which provides an amplified inverted detection signal to a monostable multivibrator 336 for thresholding to indicate a detected EMF change from sensor 320. In the illustrated embodiment, monostable multivibrator 336 provides a detection state signal to a solid state (e.g. MOSFET) switch circuit 338 to provide the thresholded momentary communication state-change signals and EMF typewriter pointer signal encoded for communication with computer 350.

Figure 4:
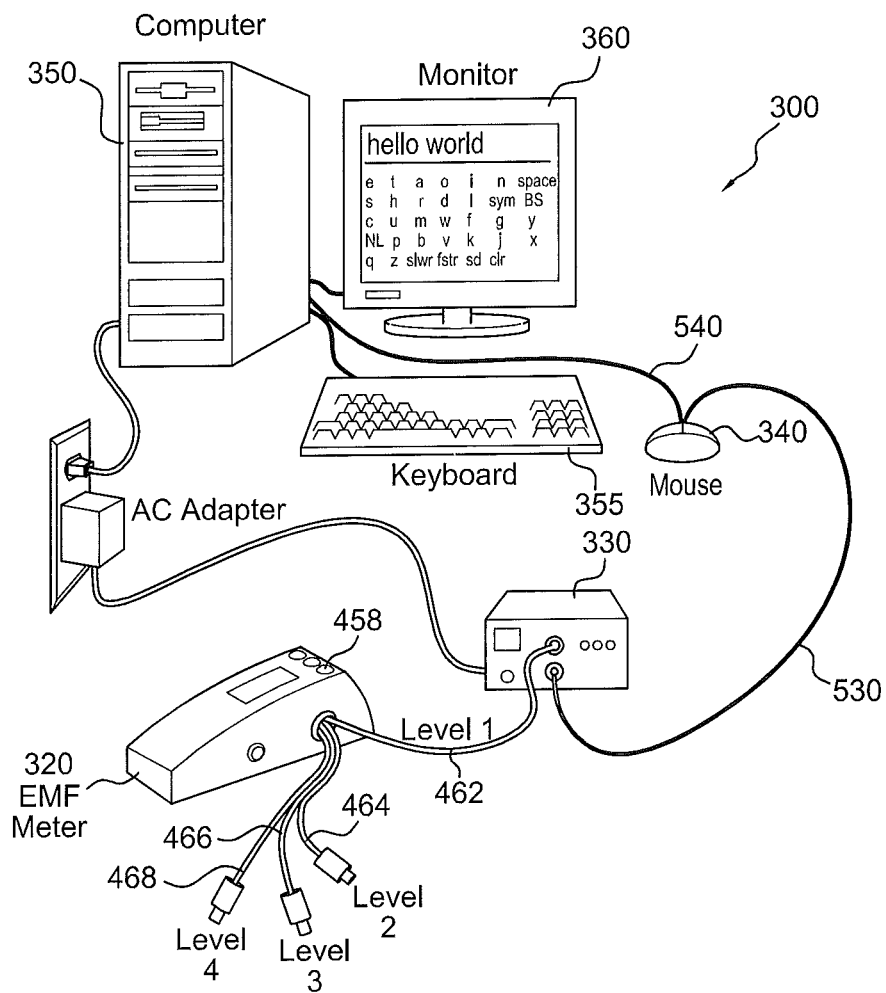
FIG. 4 is a diagram illustrating the connections between and arrangement of the components of the system of FIG. 3, in accordance with the present invention.

FIG. 4 illustrates the system 300 showing one exemplary arrangement for EMF meter or sensor 320 along with selectable connections (e.g., 462, 464, 466 and 468) to EMF typewriter adaptor 330 which provides an input to pointer or mouse 340. Pointer or mouse 340 is connected to computer 350 via cable 540 using industry standard connections such as a USB connection. Computer 350 is also configured with a standard keyboard 355 and a video display or monitor 360 used to display the prompts and the sensed and recorded indicia characters and commands generated in response to the EMF change detection signal from sensor, Gauss meter or EMF meter 320. EMF meter 320 is connected to EMF typewriter adaptor 330 optionally via a plurality of cables each providing outputs at selected levels. In the embodiment illustrated in FIG. 4, levels are available for the EMF meter change detection signal and a selected level is chosen by the user and connected to EMF typewriter interface or adaptor 330.

Figure 5:
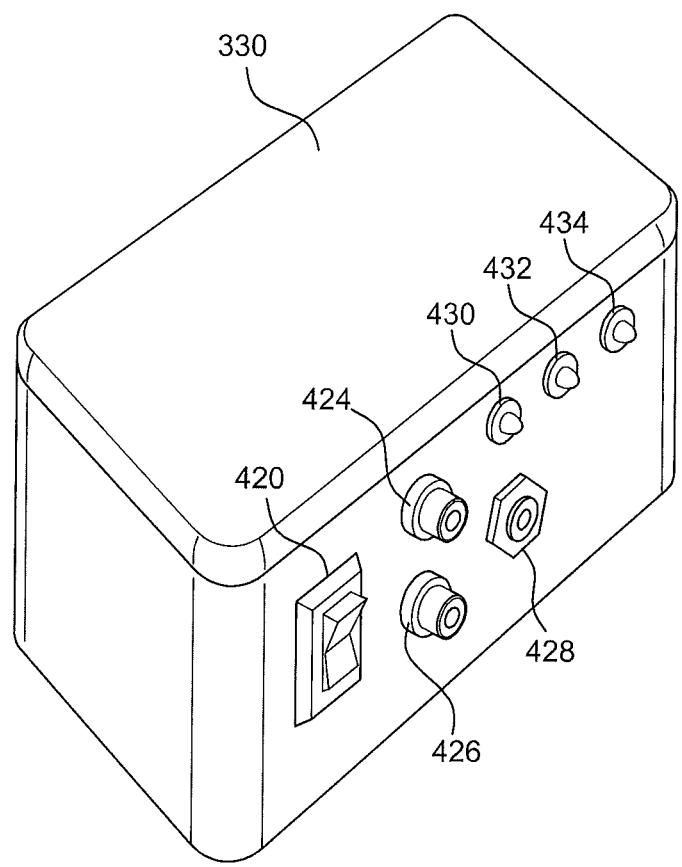
FIG. 5 is a perspective view illustrating the EMF typewriter adapter of FIGS. 3 and 4, in accordance with the present invention.

Turning now to FIG. 5, EMF typewriter adaptor 330 is shown with a substantially box-shaped housing enclosing and protecting the printed circuit boards and circuitry enclosed therein. An enclosure front wall carries an on-off power switch 420, an input RCA connector 424, an output RCA connector 426 and a power supply connection 428. First, second and third LED indicators having selected colors 430 432 and 434 are visible by the user and indicate the operational status of the EMF typewriter interface 330. In the illustrated embodiment of FIGS. 5, 9B, 15 and 16A LED indicator 430 indicates whether the power is on or off. LED indicator 432 indicates whether EMF activity has been detected as an EMF change detection signal and LED indicator 434 indicates whether output MOSFET switch 338 has been activated, thereby providing an instantaneous indication that a momentary communication state-change signal and EMF typewriter pointer signal have been encoded or indicated for communication with computer 350.

Figure 6:
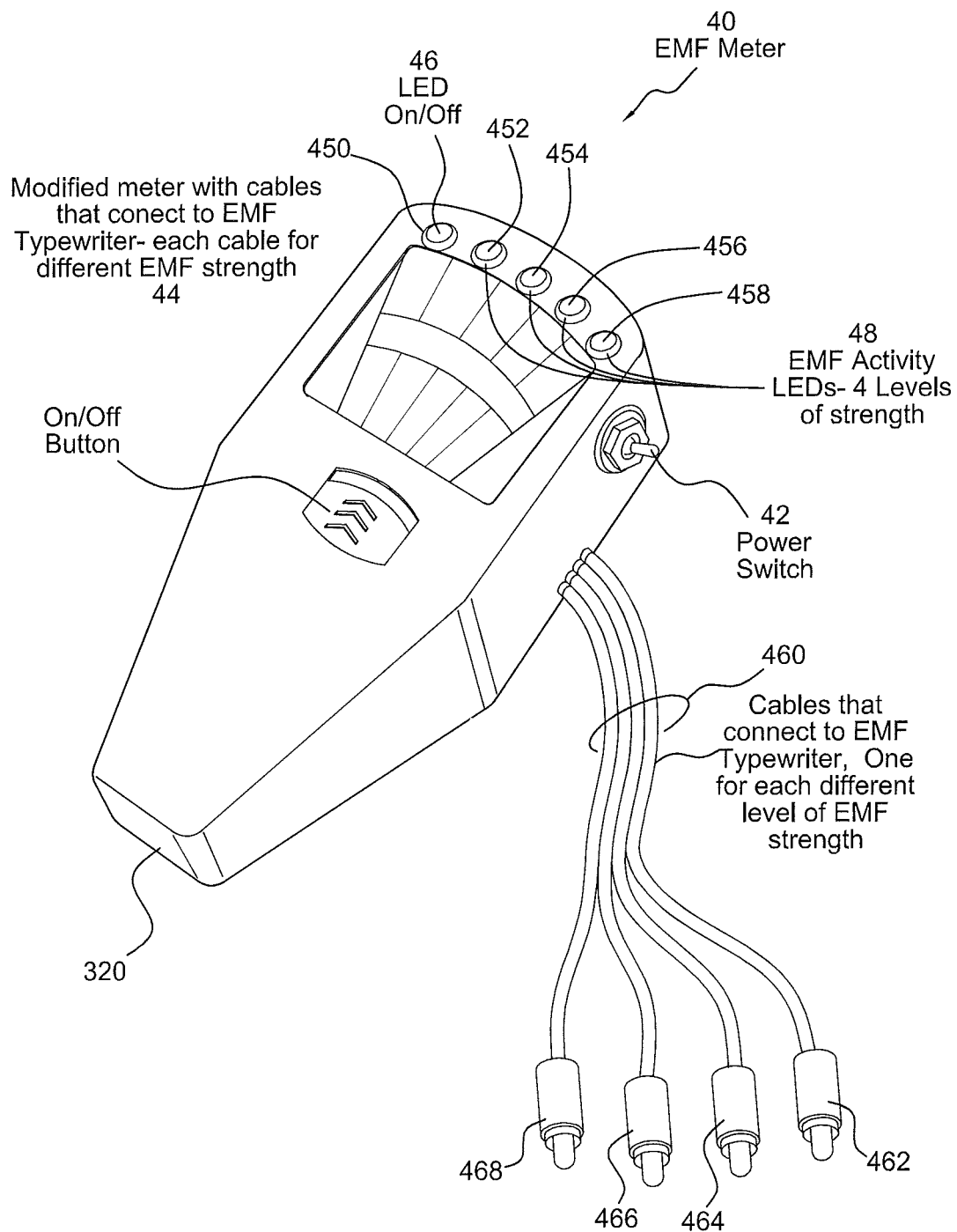
FIG. 6 is a perspective view illustrating the EMF sensor of FIGS. 3 and 4, in accordance with the present invention.

FIG. 6 illustrates a perspective view of an exemplary embodiment of the modified sensor or EMF meter 320 configured for use with the system of the present invention. EMF meter 320 can be a Gauss meter and preferably includes EMF activity LEDs indicating 4 levels of strength for the sensed momentary and localized change in an ambient electro-magnetic field. EMF meter 320 generates an EMF change detection signal in response to the sensed localized change in the electromagnetic field and the EMF detection signal is provided as an on-off state-change signal corresponding to at least one of the four levels of strength sensed and indicated on the activity LEDs (452, 454, 456, and 458). Cable bundle 460 includes a level one cable 462 which corresponds to the level of LED 452 a second higher level LED 454 is illuminated when cable 464 is energized, similarly, LED 456 is illuminated when cable 466 is energized and LED 458 is illuminated when cable 468 is energized.

Figure 7:
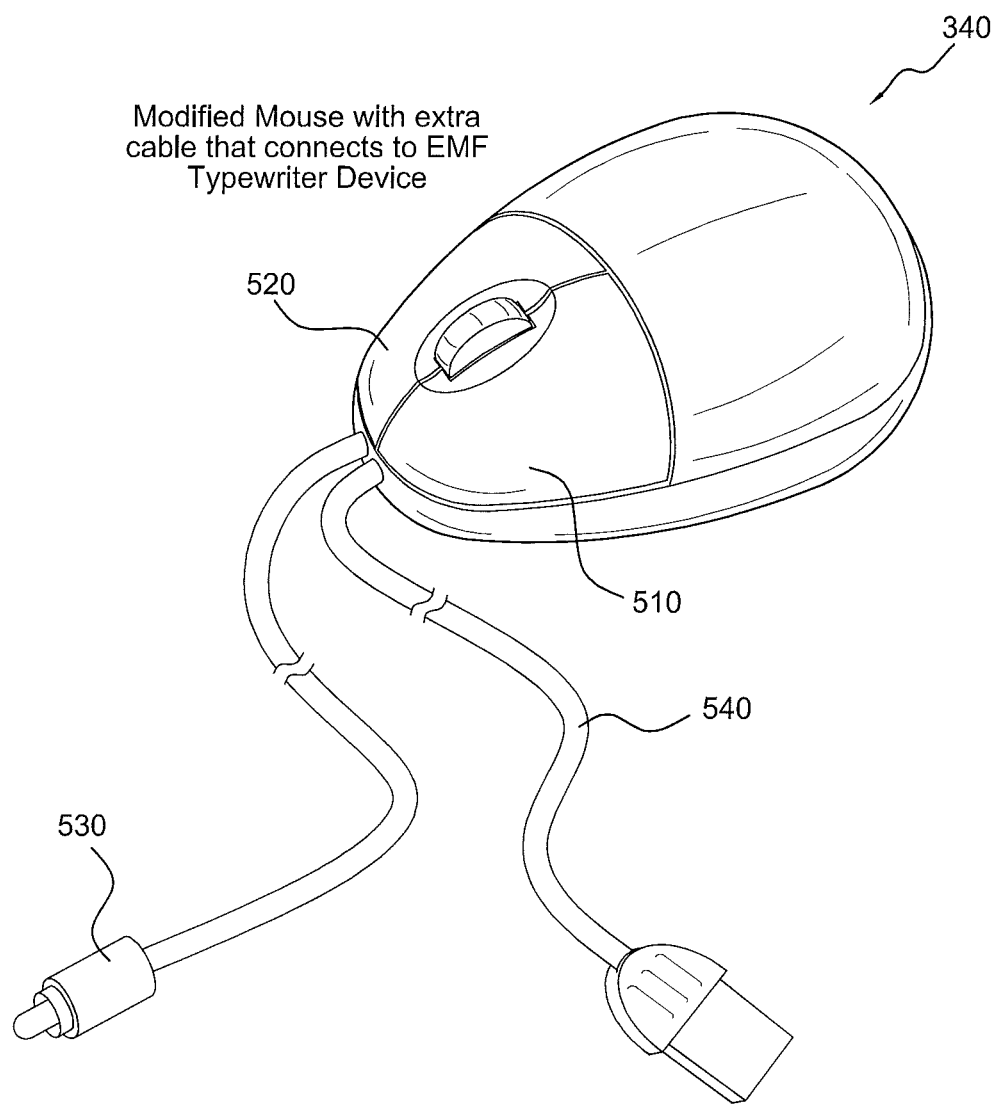
FIG. 7 is a perspective view illustrating the mouse of FIG. 4, in accordance with the present invention.

Turning now to FIG. 7, a mouse or pointer device 340 is modified for use with system 300, and includes traditional left click button 510 and right click button 520 along, optionally, with a rotary wheel and the conventional housing adapted to be held and manipulated by a user. The mouse also includes a standard cable 540 configured with a standard connector such as a USB connector for use with the complementary connector in computer 350 for mouse, track ball or other pointer device inputs. In the illustrated embodiment of mouse 340 a special cable 530 has been provided for connection with EMF typewriter interface 330 to communicate the momentary communication state-change signals and EMF typewriter pointer signal to be communicated between the EMF typewriter adaptor 330 and computer 350.

FIG. 8 illustrates and alternative embodiment for EMF typewriter interface 330 which includes USB ports adapted to connect interface 330 to the mouse and to a computer 350. The embodiment of FIG. 8 differs in that any normal or standard mouse can be connected to the EMF typewriter interface 330 this embodiment requires use of a USB cable a mouse a battery and an optional AC adaptor. In all other respects, the EMF typewriter interface of FIG. 8 is functionally identical to that described above.

Figure 9A:
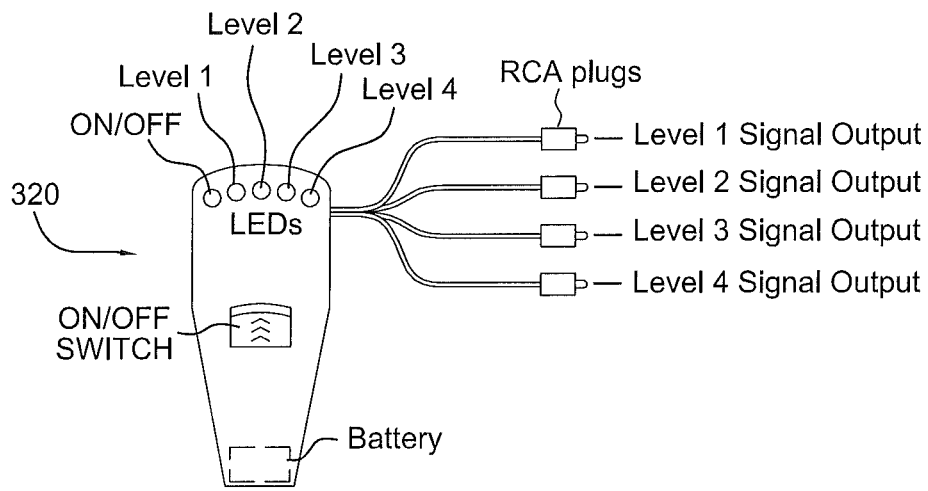
FIGS. 9A, 9B and 9C are front elevation views illustrating the components of FIG. 4, in accordance with the present invention.
Figure 9B:
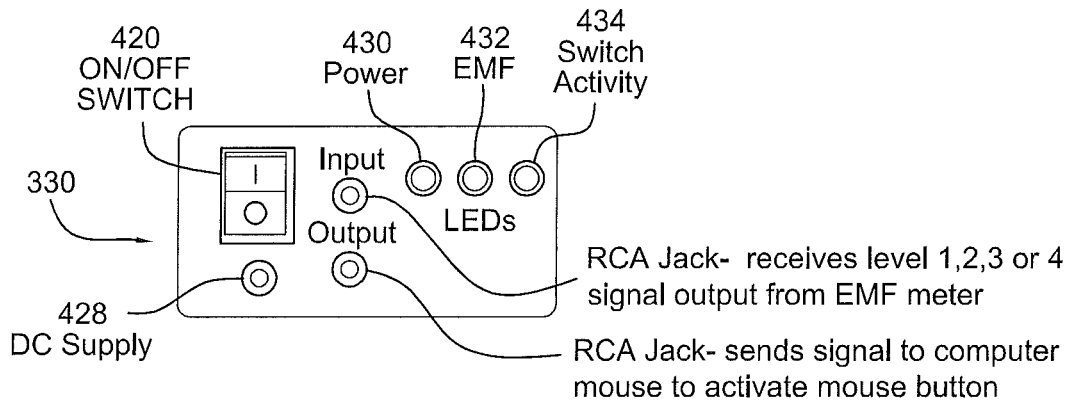
Figure 9C:
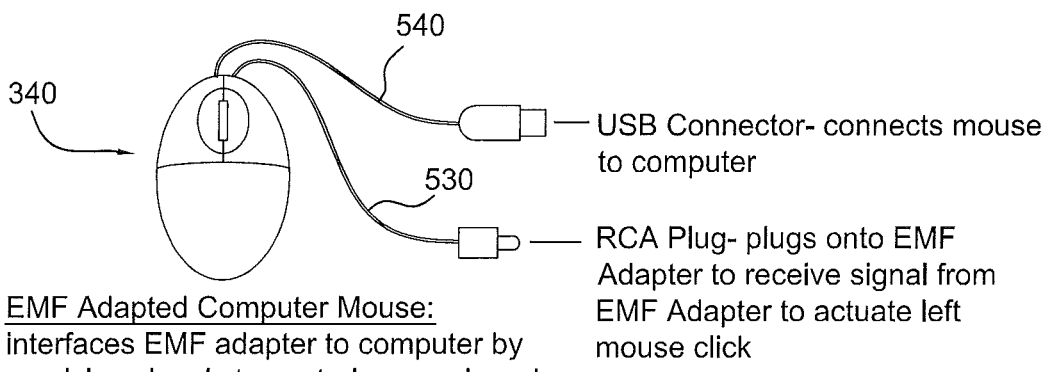

FIGS. 9A, 9B and 9C illustrate additional features of the sensor 320, the EMF typewriter interface 330 and the mouse or pointer 340. Turning to FIG. 9A sensor 320 is illustrated with a housing containing a battery controlled by an on-off switch the sensor 320 indicates a selected plurality (e.g. 4) levels of sensed EMF change and the indicator lamps for those 4 levels of sensed EMF, when illuminated, indicate that a signal output is generated for a corresponding output cable such that when the level 1 LED is illuminated the level 1 signal output is energized, when the level 2 output is illuminated the level two signal output is energized, when the level 3 output is illuminated the level 3 signal output is energized (e.g. on cable 466) and when the level 4 LED is illuminated the level 4 signal output on cable 468 is energized.

FIG. 9B illustrates a front view in elevation of an alternative arrangement for the EMF typewriter interface 330 with an on-off switch positioned above a DC supply connector an RCA jack input connector receives a selected cable (e.g. 462) from sensor 320 and an output RCA jack sends the EMF typewriter interface output signal via cable 530 to communicate the momentary communication state-change signal and EMF typewriter pointer signal encoded for communication with computer 350. The indicator LEDs can be selected with different colors to illustrate the power state, the EMF activity and whether the output switch is activated indicating a state change in the EMF typewriter output signal.

FIG. 9C illustrates a top view of mouse or pointer 340 where, in the illustrated embodiment, an RCA plug is on the terminal or distal end of cable 530 for connection to EMF typewriter interface 330 and a USB connector terminates USB cable 540 for connection to computer 350 in the illustrated embodiment, the USB connector on cable 540 connects mouse 340 to the computer in the standard way, as is well known in the art. The RCA plug terminating cable 530 plugs into the EMF adaptor to receive signal from the EMF adaptor to simulate or actuate a left click which, electrically, is similar to a user actuating left mouse click button 510 the EMF adapted computer mouse 340 thus interfaces the EMF adaptor 330 to computer 350 by receiving signals to control computer 350 in order to work with the computer program described in greater detail below.

As noted above, in the illustrated embodiment of the system of the present invention computer 350 is programmed to help implement the method of the present invention for converting signals indicating localized changes in an electromagnetic field into an indication or message. Computer 350 is programmed to generate momentary communication prompts or display characters momentarily and to receive the EMF typewriter pointer signal in response and then correlate the momentary state change signal encoded in the EMF typewriter pointer signal with a momentary communication prompt or displayed character on the computer to identify a sensed indicia or command from the EMF change detection signal indicating that someone communicating remotely selected the displayed character or selected the menu command as part of a communication process.

Figure 10:
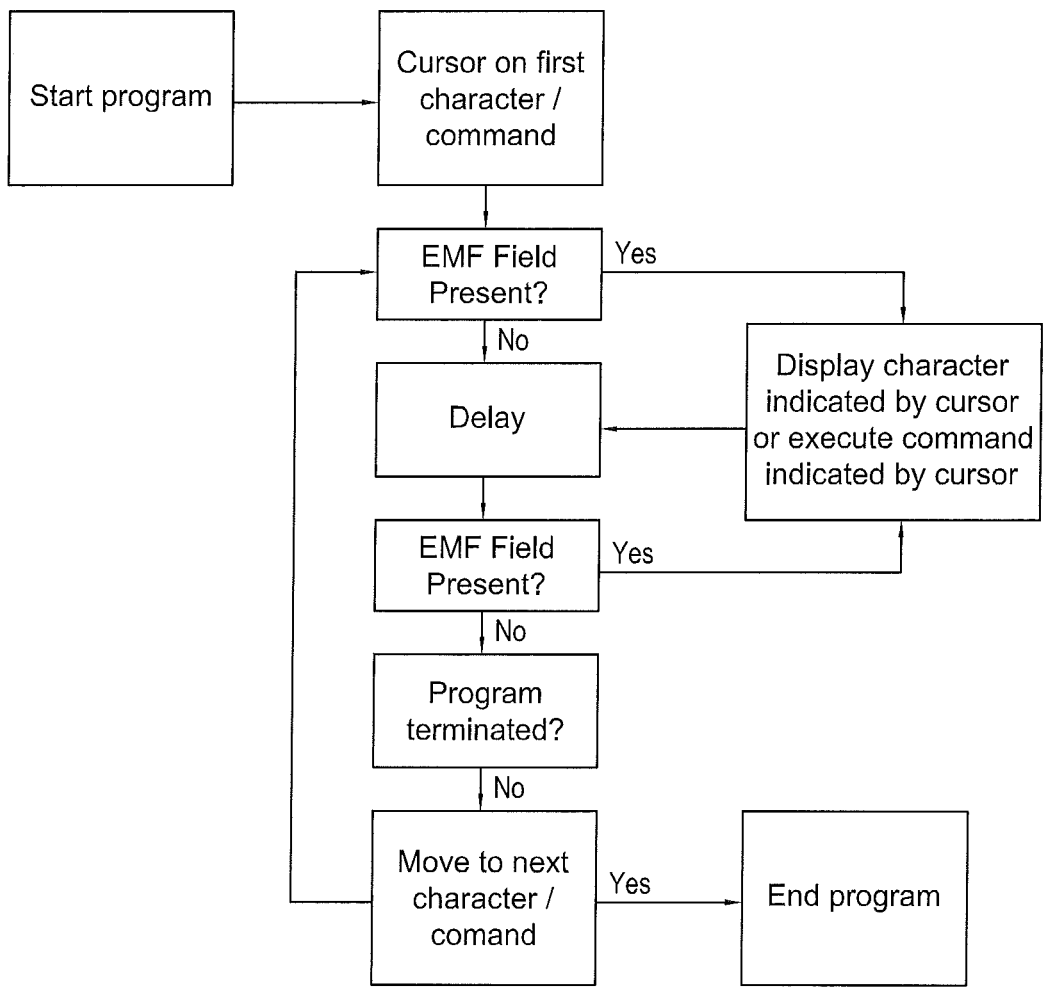
FIG. 10 is a process flow diagram illustrating the computer program controlled method of present invention.
Figure 11:
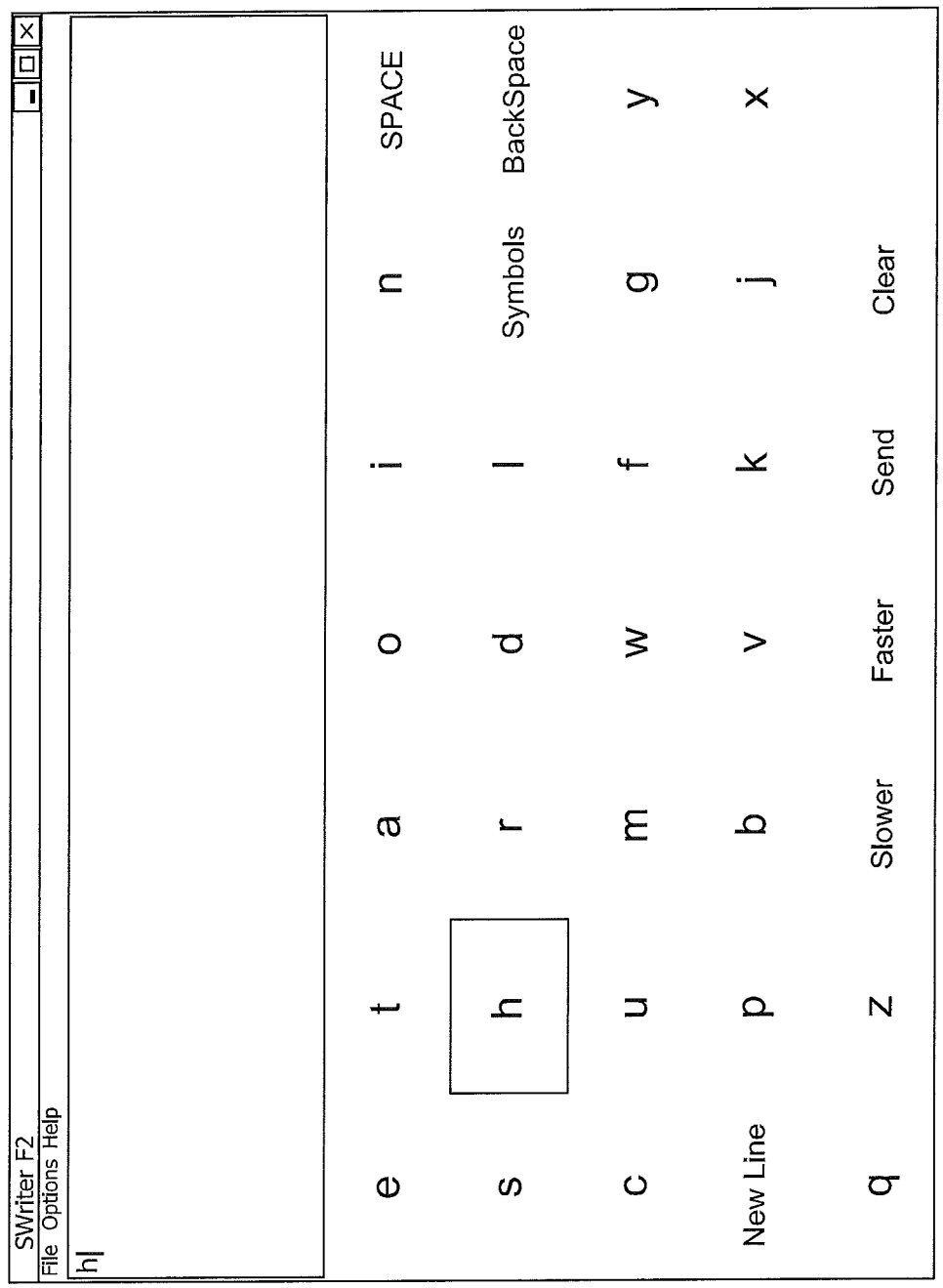
FIGS. 11-14 are computer display screen shots illustrating the displayed prompts, recorded message characters and commands selected using the computer program controlled method of present invention.
Figure 12:
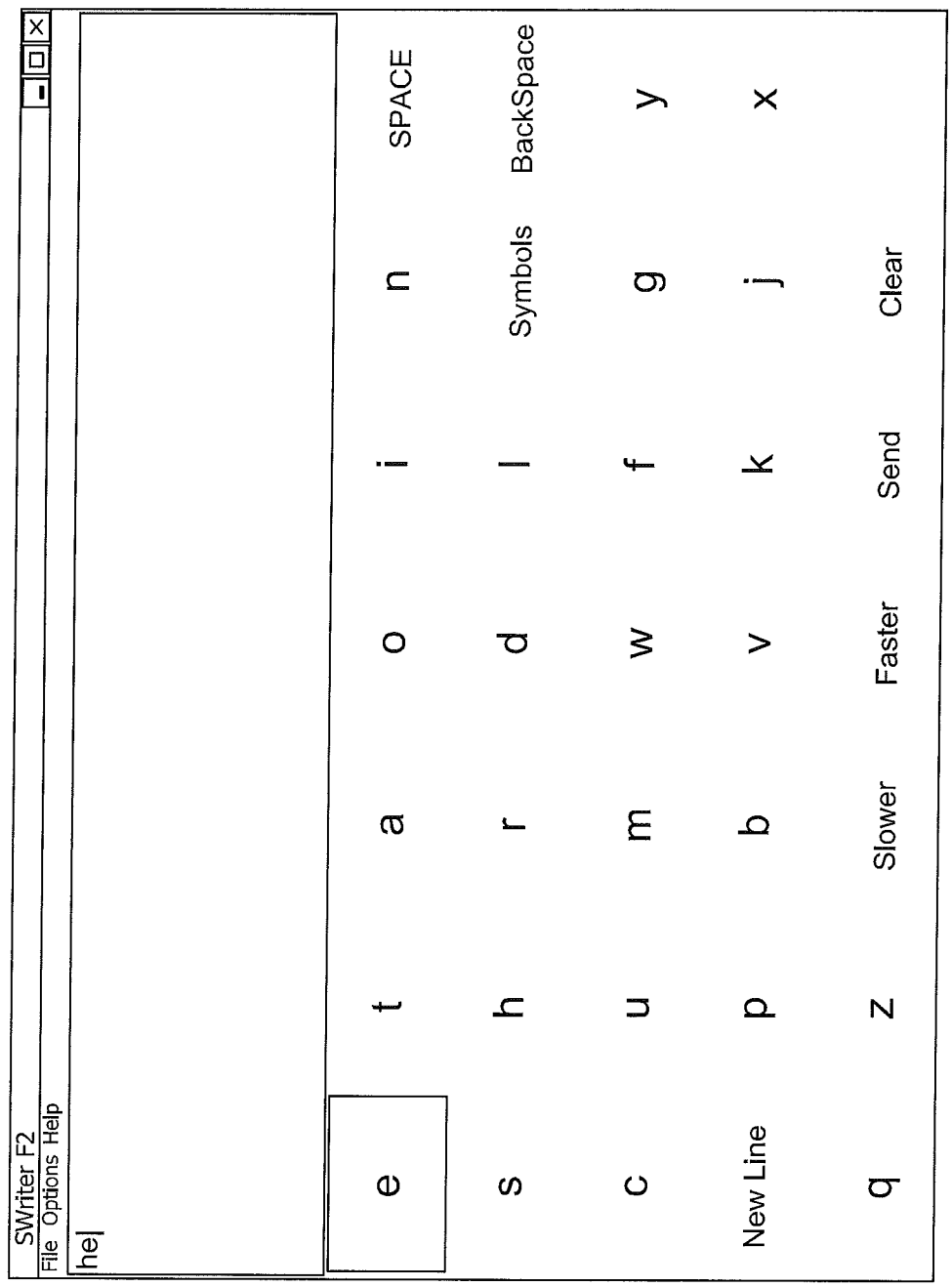
Figure 13:
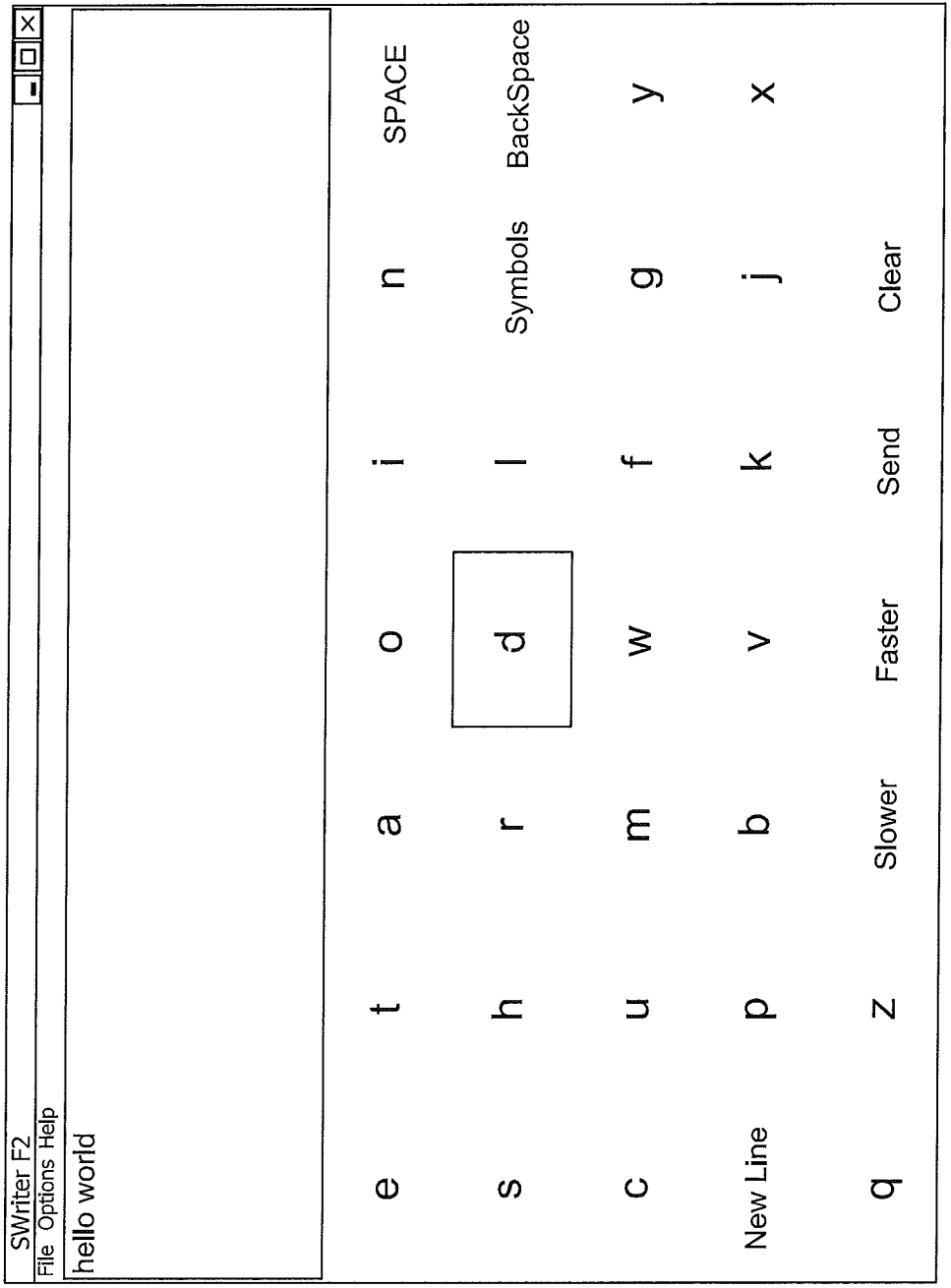

Turning to FIG. 10, the process flow as programmed into computer 350 is illustrated. At the beginning of the EMF typewriter program, the computer screen or display 360 displays a selected character, command or indicia. FIGS. 11, 12 and 13 illustrate displays for an exemplary sequence of such steps. In FIG. 11 the character or letter "H" is indicated and, if selected by actuation of the EMF typewriter pointer signal, that selection is displayed in a field at the top of the screen (as shown in FIG. 11). Returning to FIG. 10, the cursor-displayed or selected character (such as "H" in FIG. 11) is recorded and a condition is tested whether the EMF field is present, if yes, the displayed or prompted character is indicated by the cursor (or if a command is indicated such as "new line" as shown in FIG. 11 the command is executed), but if the EMF field is not found to be present, then a delay or wait period or interval is chosen to permit the communication prompt to be present for a selected interval (e.g. a few seconds to 1 minute). If the EMF field is not present after the delay, the user is given the option to terminate the program or to move to a next character or command. The decision to move to the next character or command may be undertaken automatically as part of the program so that all of the characters or communication prompts available in a selected set (such as illustrated in FIG. 11) are sequentially made available, each for a limited delay interval. In accordance with the method of the present invention, the prompt moves to the next character or command and the sequence is repeated. Each of the characters or commands displayed which correspond to a momentary detection of the EMF field being changed or being present will be recorded and displayed, preferably on the top of the screen as shown on FIGS. 11, 12 and 13. FIG. 11 demonstrates a displayed character "H" which would correspond to a detection of a change in the EMF field or the EMF field being present during the time the character or indicia H is highlighted. FIG. 12 shows the prompt character being changed to E and further illustrates that "E" was selected by detection of a change in the EMF field and recorded as part of a message. FIG. 13 shows a completed message "hello world" which would be concluded with the character D being present as the prompt character when the EMF field is detected.

This "prompt then detect" sequence is repeated until a message is completed or the users decide to conclude the activity. A remotely located and unseen user may use an activator such as an EMF changing or magnetic planchette or pointer 150 in proximity to EMF meter 320 to generate a momentary and localized change in the ambient electromagnetic field near sensor 320, thereby generating an EMF change detection signal. The remotely located or unseen user could thereby view the displayed character indicated by the cursor and only indicate selection of the displayed character or displayed command when the appropriate character or command was displayed as the prompt, thereby permitting the unseen user to communicate thru selection from a plurality of indicia characters or commands when polled or displayed on computer screen 360.

Figure 14:
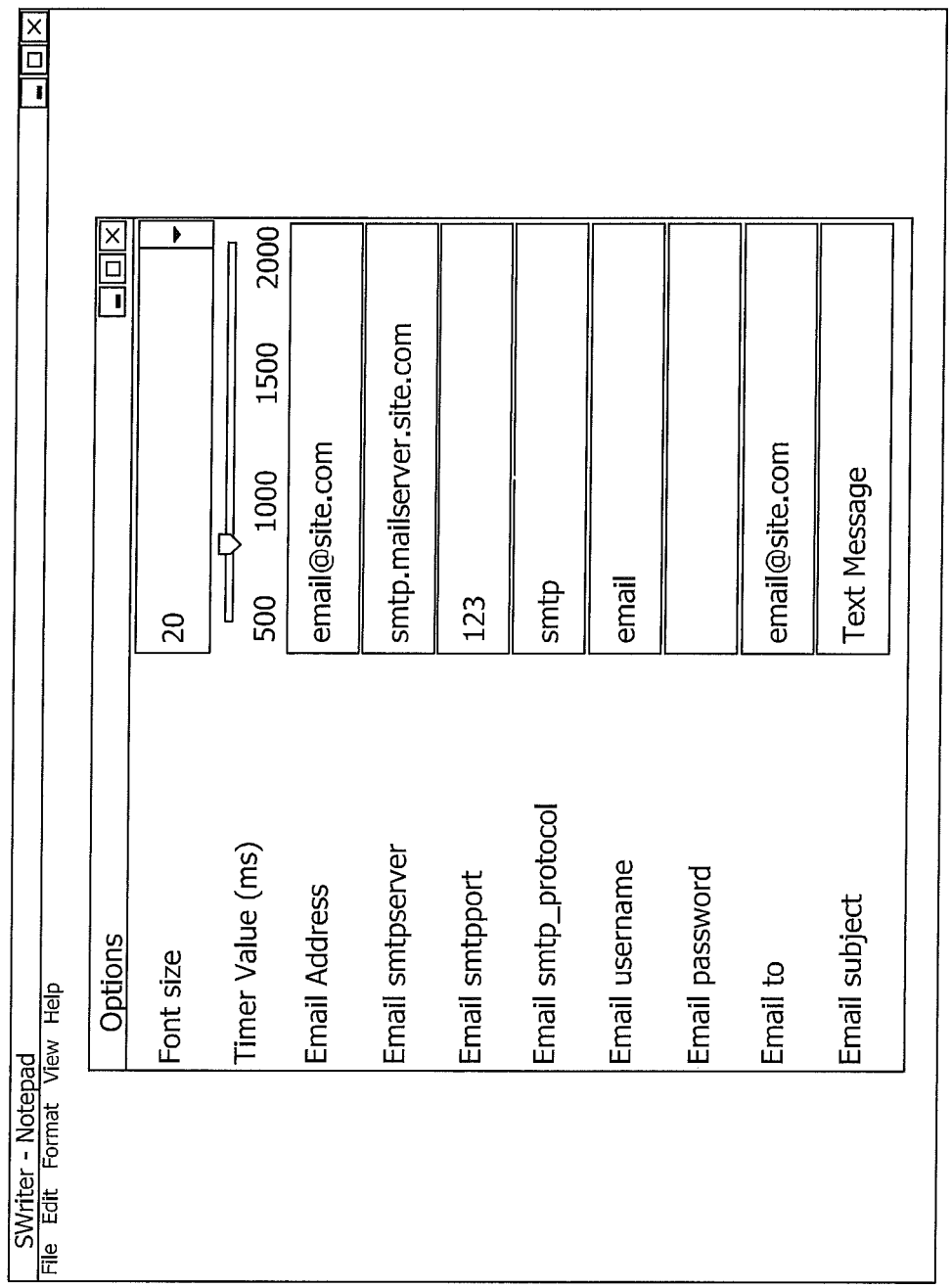

FIG. 14 illustrates the options for using computer 350 to allow changes in font size, allow changes in timer value or delay (i.e., character display, delay or dwell time as in FIG. 10). Users may also communicate with third parties at selected email addresses, communicate with selected email SMTP servers, communicate with email SMTP ports, select an email protocol, select an email user name, select email passwords, select intended recipients for email communications or to enter selected email content or subject lines, computer 350 and EMF typewriter 310 can therefore be used to communicate using traditional email or web based communication techniques in connection with the method of the present invention.

Figure 15:
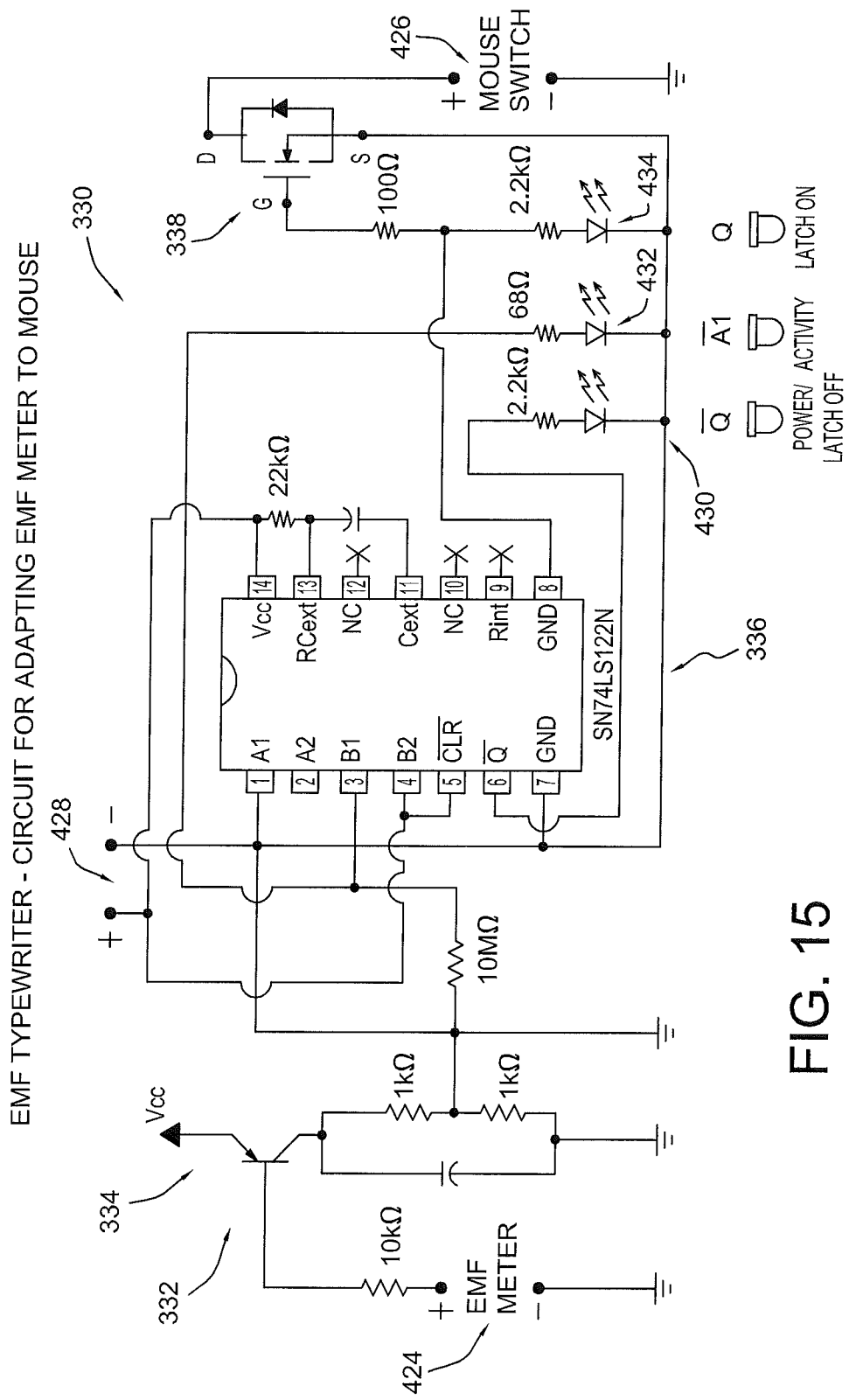
FIG. 15 is a schematic diagram illustrating the EMF typewriter adapter circuit of FIGS. 3 and 5, in accordance with the present invention.
Figure 16A:
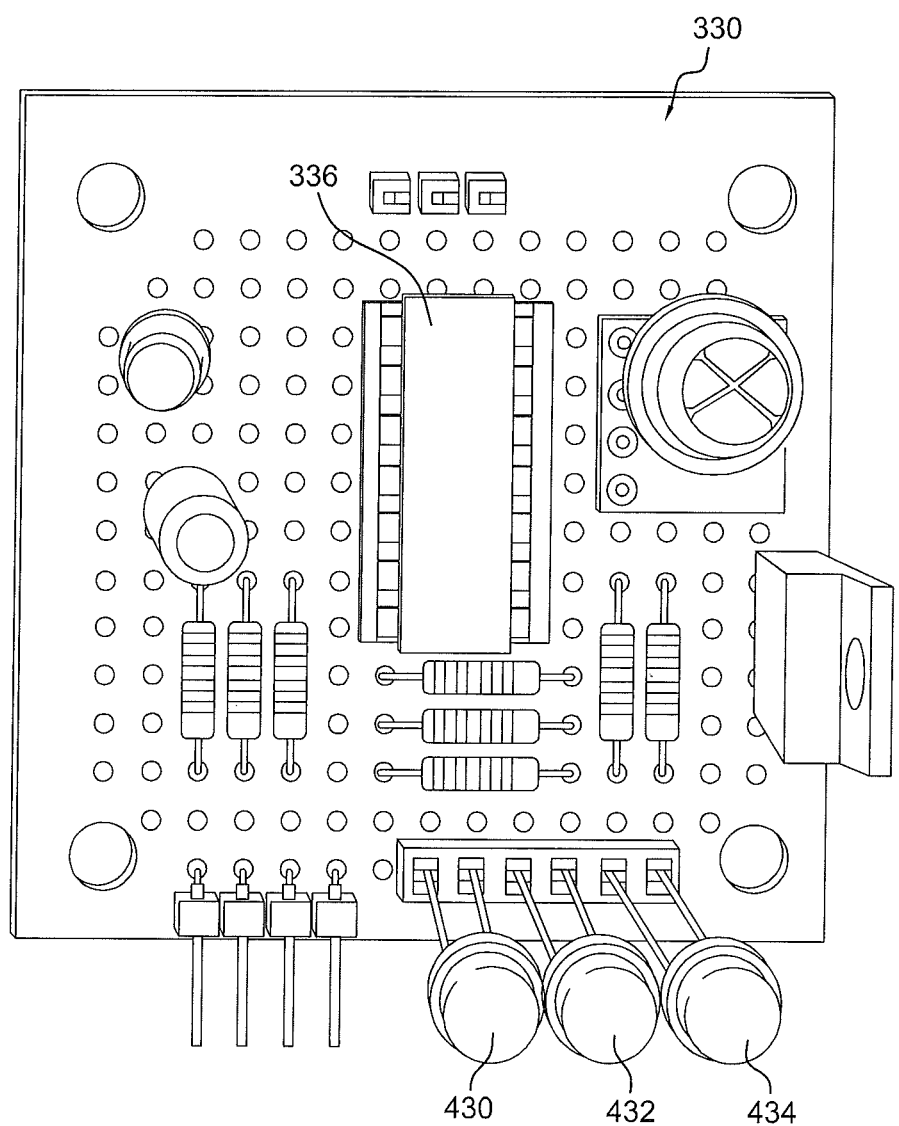
FIG. 16A is a front elevation view of the EMF typewriter adapter circuit of FIGS. 3 and 15, in accordance with the present invention.
Figure 16B:
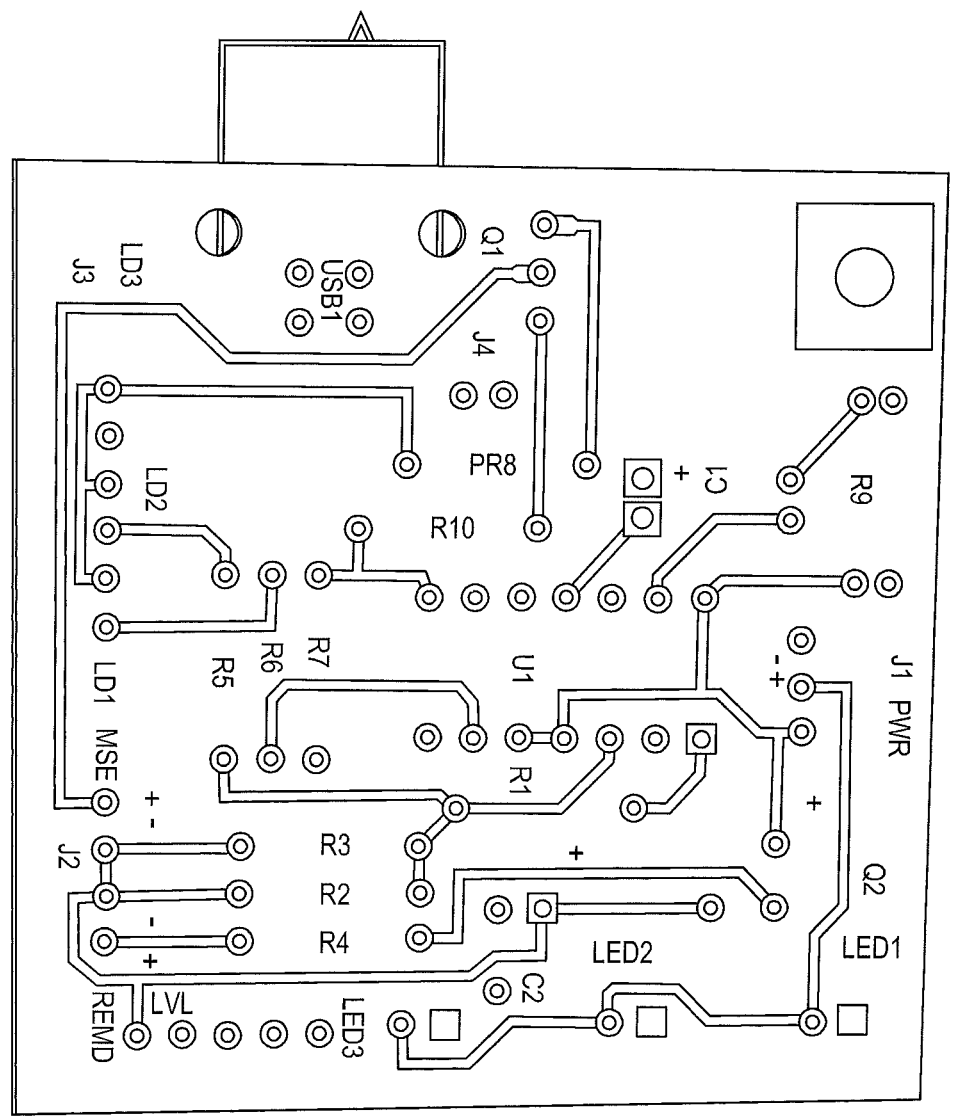
FIG. 16B is a front elevation view of an alternative (USB) EMF typewriter adapter circuit board layout of FIGS. 3 and 8, in accordance with the present invention.
Figure 16C:
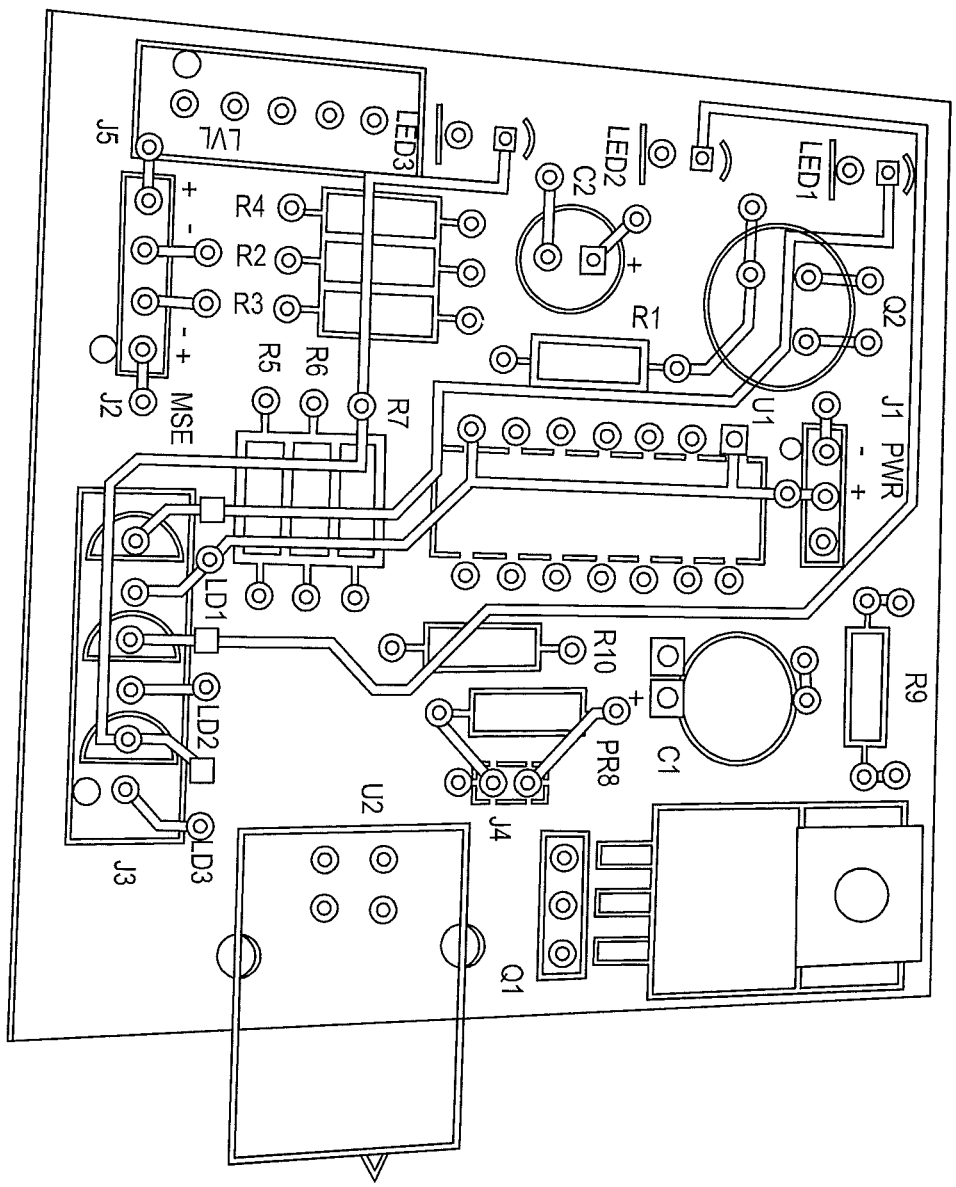
FIG. 16C is a front elevation view of the EMF typewriter adapter circuit board layout of FIGS. 3 and 15, in accordance with the present invention.

Returning to the hardware, FIGS. 15-17 illustrate an exemplary embodiment for the EMF typewriter interface 330 and specifically the circuitry including the input inverter and amplifier 332, 334 the thresholding monostable multivibrator 336, the output latch or switch 338 and the indicating LEDs 430 432 and 434 which are illustrated in a prototype or breadboard layout in FIG. 16A. FIGS. 16B and 16C illustrate layouts for printed circuit boards for use in the EMF typewriter interface embodiments and FIG. 17 illustrates a front view, in elevation, of the housing for EMF typewriter interface 330 illustrating the layout of components as discussed above.

Third Embodiment

Controls & Toys

In another embodiment of the method and apparatus of the present invention, an unseen first user or "sender" (e.g. carrying a wand, magnet or other source of magnetic flux) moves, points or actuates the wand (or other EMF source) without speaking and engages in a sequence of control steps. The EMF sensor (e.g., a Gauss Meter or sensor such as 130 or 320) is configured to sense momentary changes in the position of the EMF source and, in response, provides specific is control actuations, thereby permitting the sender in control of the EMF source to "Play". In a game entitled "Ghost Toys" the method of the present invention permits the user of the EMF source to send or provide indications to the EMF sensor, indicating different states of control, during play. The predefined states of control indicated for use during play preferably include "On", "Off", "Right", "Left", "Up" and "Down". In this way the sender or user of the EMF source may provide an electromagnetic indication which is sensed by the Gauss Meter or other EMF sensor so that, in response, a second user or receiving game player may respond to the control messages when soundlessly delivered by the sending user in control of the EMF source or wand.

FIG. 19 illustrates a system 780 and method for controlling a remotely controllable vehicle (e.g., a toy car or the like) which is triggered by detection of a momentary and localized change in an ambient electromagnetic field, in accordance with the method of the present invention. System 780 includes an EMF Sensor and Switch 782 which is functionally identical to EMF sensor 320 and Adaptor 330 and are used to actuate or trigger a battery powered motor which, in turn, drives wheels to propel the vehicle across a supporting surface.

FIG. 20A illustrates a system 800 and method for controlling a camera (or a local image generating instrument) which is triggered by detection of a momentary and localized change in an ambient electromagnetic field in an area covered by the camera 802. FIG. 20B illustrates a system 801 and method for controlling a camera (or a local or remote image generating instrument) which is triggered by detection of a momentary and localized change in an ambient electromagnetic field in an area covered by the camera 802 using separable EMF sensor and switch 806.

FIG. 20C illustrates a system 900 and method for controlling a camera (or image generating instrument) which is triggered by detection of a momentary and localized change in an ambient electromagnetic field sensed by an EMF sensor and switch or actuator 906 sited in an observed area covered by the camera, in accordance with the present invention. The EMF sensor and actuator 906 preferably includes a wireless or infrared (IR) signal generating remote control telemetry circuit for controlling the camera configured to actuate the camera for a single image or to record a video of a selected duration. FIGS. 20A and 20B illustrate use of an "EMF Sensor Switch" which is functionally identical to EMF sensor 320 and Adaptor 330 and are used to actuate or trigger a camera event in response to sensing a momentary, an EMF event manifesting a localized change in the EMF proximate an area of interest and under observation by the camera (e.g., 802 or 902).

In the embodiments of FIGS. 20B and 20C, the EMF sensor switch is placed in front of the camera at some distance, and when an EMF Trigger Event is detected, the EMF sensor switch (806 or 906) activates a wired or wireless remote control (e.g., RF or IR) signal received by the camera to trigger the camera (and potentially a flash unit) to take a photograph. If the camera is configured for video, the actuation signal from the remote responding to the EMF sensor initiates or starts the recording of the area under observation, including the person, animal or thing which caused the EMF event. This can be used in conjunction with any camera or device which allows remote activation of shutter including: video cameras, cameras with time/event/moon phase record, etc. In this embodiment, the EMF event actuated control acts very much like a trap camera where in the case of a trap or game camera, the sensor and the camera are conjoined (either in a unitary housing, as shown in FIG. 20A or in separable components as shown in FIGS. 20B and 20C).

Fourth Embodiment

Synthesized Voice Conversation

In yet another embodiment of the present invention, a game entitled "EMF Voice Meter" is played with a computer or controller (e.g., 140, 280 or 350) is programmed to synthesize playback of vocal responses so that a first EMF source change, sensed by the EMF sensor corresponds to "Yes" (indicated by a green light) or "No" (indicated by a red light) where, in addition to the green and red lights, the voice synthesizer plays back a reproduced recording or synthesized audio playback signal corresponding to the words "Yes" and "No". Preferably, the system is programmed with multiple voices for an adult man, an adult woman, a youthful girl, and a youthful boy. By using first and second EMF sensors or Gauss meters located in spatially separated or orthogonally aligned positions, "yes" or "no" responses may be recorded in connection with an activity where a series of questions are asked. In a preferred embodiment of the system for this game, a voice recording system with a microphone and data storage is used to record a questioner's questions and the synthesized responses from the EMF voice meter are recorded in sequence so that a transcript of questions and answers can be prepared.

General Properties:

More general applications are contemplated. The apparatus method of the present invention are also likely to be helpful in situations where limited communications are possible because voice and physical movement are limited or nonexistent, but changes in a localized electromagnetic field can be detected and measured using, e.g., a specially configured EMF sensor such as those illustrated in FIGS. 6 and 9A. By using a Gauss meter for sensor 320 as a binary indicator and by connecting an electronic display or message board configured to receive signals from the Gauss meter, it is possible to display characters or other indicia corresponding to the sender's responses. Selection of characters is made when a sender or EMF signal generating user (e.g., carrying a magnetic pointer or wand with a magnet) momentarily alters or affects the normal, ambient electromagnetic field and that momentary EMF change is sensed with the Gauss meter (or with a spatially arrayed plurality of meters), thereby providing communication without requiring speech or physical presence or visible input from the sender.

When the user or sender seeking to communicate soundlessly sees a sequence or stream of letters of the alphabet or other indicia on an electronic sign, message board or display screen, the sender monitors the sequence and simply waits for the correct letter or indicia to be identified in the display. The sender then actuates or influences the electromagnetic field in the presence of the Gauss sensor or sensors until the actuation is sensed and the selected letter is indicated or a return code is selected. This display-select-sense process is repeated until a given communication message is complete. Alternatively, the sender can continue to indicate control responses or yes or no answers.

As noted above, electric signals generated within and interpreted by the human brain are measurable by means of Electroencephalogram (EEG) sensors, thereby making it possible to directly sense electromagnetic fields generated in the brain. Applicant is also contemplating mechanisms whereby the human body can be adapted for use as an antenna or aerial which is configured for use to transmit and receive energy for the purpose of communicating through the surrounding environment.

The system of the present invention (e.g., 300) may include a computing program that displays either characters or menu commands on a computing device visual display (e.g., 360) where it is clear to a user of the system that only one character may be selected at any one moment in a time sequence. The system also includes a computing device input mechanism 310, used with or without a traditional computer mouse, where the event capture is not from physical actuation of the mouse but instead is in response to an EMF threshold detection event. The system 300 of the present invention provides indicia or character selection by coordination between the computing device showing characters to an end user during a selection interval and the computing device input mechanism when an EMF threshold event is captured. The system 300 of the present invention also provides the ability to select a sequence of letters to spell words based upon a series of EMF threshold events for those participating in paranormal investigations. As best seen in FIGS. 3-7, system 300 includes an EMF Typewriter 310 with an Adapter, having an AC Adapter Jack 428, an On/Off Switch 420, a Connector for Modified Mouse 426, a Connector for a Modified EMF Meter 424, an LED to indicate Power status 430, an LED indicating sensed EMF Activity and an LED for switch or Mouse Button Activity.

Preferably, a computing program executes the method of the present invention on a computing device (e.g., 350). A visual display 360 attached to the computing device 350 shows characters and menu commands such that a single character (e.g., "h") is highlighted by a border around the selected character during a single moment in a time sequence. A computing device input mechanism 310 is attached to the computing device. The computing device input mechanism senses an EMF change and then generates an electronic event. The electronic event is registered by the computing device and monitored the computing program. Preferably, the computing program determines which character or menu command is highlighted during the electronic event and either records the character or executes the menu event. The computing device input mechanism's electronic event may be generated in a number of ways. The electronic event may be generated by physical action. The electronic event may be generated by a sensor (e.g., 320) reaching a threshold. The computing device input mechanism for the system of the present invention is preferably a sensor (e.g., 320) that detects a momentary localized change in an electro-magnetic field (EMF). Optionally, a control or dial is configured to set different EMF threshold levels. EMF change detection threshold levels are selected from among four or more pre-defined EMF change levels.

An EMF source is used to trigger the sensor's threshold. The sensor threshold creates and electronic event. The electronic even is registered by the computing device. The computing program monitors the electronic events of the computing device. When an electronic event is detected, the computing program determines what character or menu command is highlighted and either records the character or executes the menu command.

Applicant's first prototype (illustrated in FIGS. 3-7) of a system including an EMF typewriter (e.g., 310) employed an EMF Meter output to trigger a mouse button-like signal when an electromagnetic field was present. Adapter circuit 330 was built to achieve this by converting a D.C. voltage level into a signal from an electronic switch 338 that electrically shorted or closed a normally open switch in a pointer or mouse 340 (e.g., the left mouse button 510). This was done as follows: When there was no electromagnetic field present near the EMF meter 320, the voltage level at the output of the op-amp that drives the LEDs indicating EMF level was stable at about 6 volts. When an electromagnetic field was present and detected by the meter 320, this voltage level dropped to about 4 volts. The EMF level indication voltage signal was fed into a transistor inverting amplifier circuit using a 2N2907A transistor which changed the negative-going voltage signal into a positive-going voltage signal ranging from 0 to 5 volts, such that, when there was no electromagnetic field present, at this stage, the voltage level was at "zero." In the presence of an electromagnetic field, this voltage level went to 5 volts.

This positive-going voltage signal was fed into a SN74LS122N monostable multivibrator circuit 336 and implementing-resistor and capacitor timing circuit. In this stage, when the signal went from 0 to 5 volts, it latched the output signal high for a period of time as required by the user, and in this case, about 0.5 to 1 second. As long as there was an electromagnetic field present, the timing circuit would reset continuously, holding the output signal high. It is not until the electromagnetic field is no longer present, and the input signal to this stage goes back to 0, and stays at 0, that the timing circuit will continue to hold the output signal level high until the 0.5-1 second delay has lapsed, allowing the output signal to return back to 0 volts.

Applicant has noted that the nature of a non-static electromagnetic field, such as that produced by AC current, continuously changes from negative to positive, at 50 or 60 cycles per second, as in household electricity. When such a field is near the EMF Typewriter system (e.g., 310), without a latching delay, this alternating field would cause the mouse button to click on and off at the same frequency. In order to control the mouse click to that similar to the standard human use of a mouse click, a monostable multivibrator circuit was introduced to convert the rapidly changing signal into one that was held in its high state until the alternating electromagnetic field was no longer present, and then allowing the signal to drop down to its low state, while the alternating electromagnetic field is still no longer present, enabling the circuit to properly react to the next electromagnetic field intentionally brought into the presence of the system. The low to high output signal from the monostable multivibrator circuit 336 was fed into the gate of a IRF630B N-Channel MOSFET switching transistor 338. The output of transistor 338 was connected in parallel to the normally open mouse button, and in this case, the switch for the left mouse button 510.

The way the mouse button switch 338-510 works is that a voltage signal is normally held high, typically at 5 volts, for a mouse button. When the mouse button 510 is pressed, this high signal is shorted to ground with the switch pressed to the closed position, causing the voltage signal for the mouse button to go low, typically 0 volts. By simulating this voltage signal with the MOSFET switch 338, the mouse button can be switched to a low signal, which is the signal to the mouse that indicated the mouse button was pressed, without actually pressing the physical mouse button 510. The parallel connection between the MOSFET 338 and the physical switch actuated by mouse button 510 is such that the MOSFET drain terminal is connected to the mouse switch terminal that is connected to the high signal of 5 volts, and the MOSFET source terminal is connected to the ground terminal of the mouse button switch. When the MOSFET switch 338 is activated, that is the N-channel of the MOSFET is opened, or no longer pinched, it essentially causes a short between the drain and the source terminals. Since these terminal are in parallel with the mouse button switch, the mouse button terminals are shorted, causing the switch to close, and thus the mouse's 5 volt mouse button signal to go to 0 volts, indicating an event with the mouse, and in this case, pressing or clicking the left mouse button. To tie it all together, the presence of an electromagnetic field causes a voltage change in the EMF detecting circuit, which is conditioned for the input of a delay circuit causing the voltage change signal to activate and hold a transistor switch 338 which is connected to and controls the pressing of a mouse button.

Adapter circuit 330 is one way to allow an electromagnetic field to interact with a computer 350 in a controlled way. Another way could be feeding the voltage signal from the EMF meter into a buffer IC (not shown) and tying the output to the mouse chip's button input. In other words, one simple IC chip can allow an EMF field to control a simulated mouse click with an EMF meter and a mouse.

Figure 18:
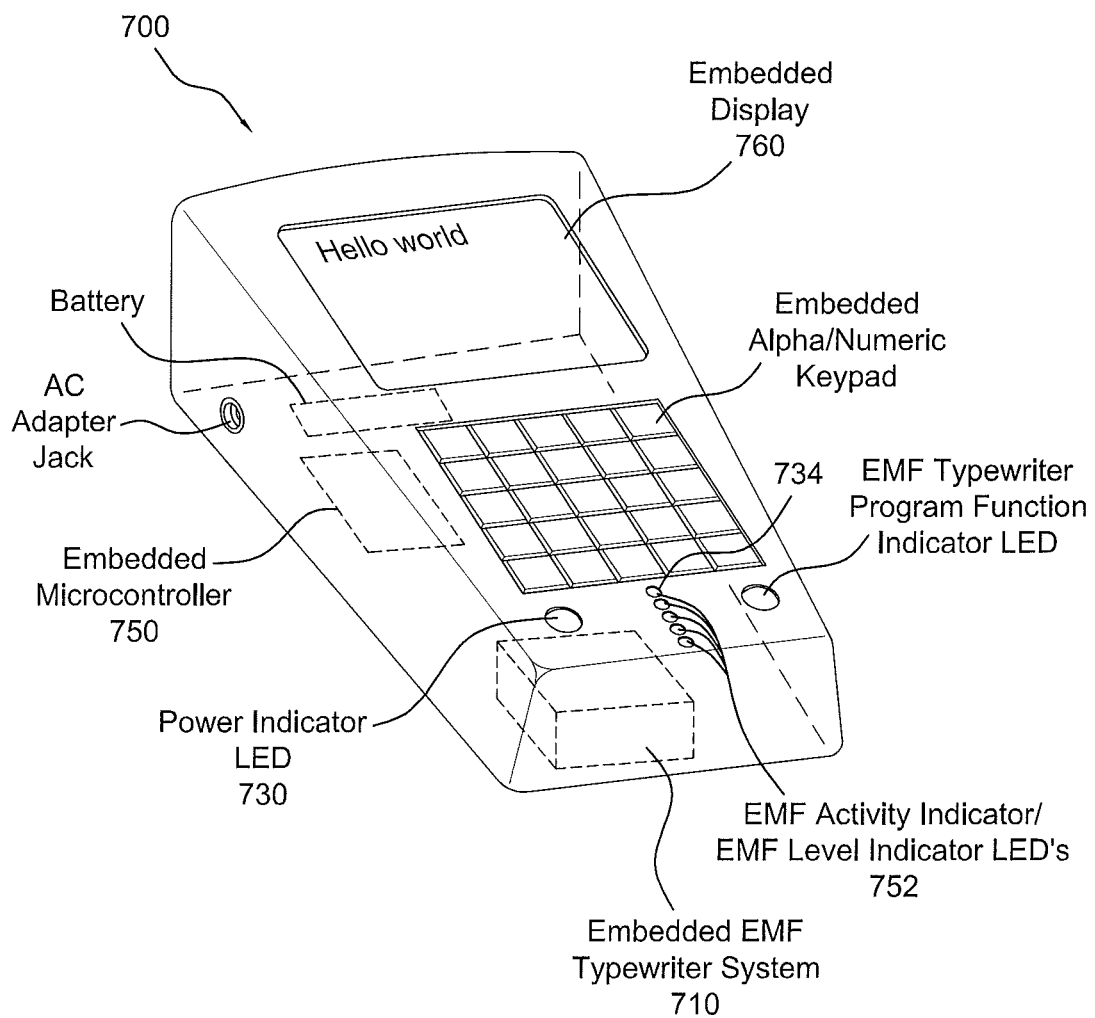
FIG. 18 is a perspective view illustrating a self contained embodiment of the EMF typewriter, in accordance with the present invention.

As illustrated in FIG. 18, this invention may be implemented as a combination of all components into one package, such that the EMF Typewriter becomes a device similar to a mouse in which, the mouse controlling features of this device are controlled by changes in a sensed electromagnetic field, giving it the ability to control a Typewriter program on the computer. A microcontroller and display may be embedded to the EMF Typewriter device 700, making it a stand-alone EMF Typewriter device, without the need of a separate computer.

FIG. 18 illustrates a new embodiment which is self contained and thus includes all of the operational components described above configured in a system within a single housing. Self contained EMF typewriter 700 includes an embedded micro controller 750 which serves the same purpose as computer 350 the embedded alpha numeric key pad is connected to embedded microcontroller 750 which generates a display on LED or LCD panel 760. A power indicator LED 730 is positioned opposite an EMF typewriter program function indicator LED and near an EMF activity indicator 734 which is aligned above the EMF signal strength level indicator LED 752, 754, 756 and 758 which function in the same way as corresponding LED for EMF typewriter 310 as illustrated in FIGS. 3-9c. An embedded EMF typewriter system circuit 710 performs all the functions of EMF typewriter 310 as discussed above but is preferably configured as a compact solid state circuit adapted for economical manufacture and low power consumption. The self contained EMF typewriter 700 operates in much the same way as the system described above in that a sensor is configured to sense a momentary localized change in an ambient electromagnetic field and generate an EMF change detection signal in response so that the electromagnetic peripheral adaptor of EMF typewriter 710 can generate an EMF typewriter porter signal encoded for communication with microcontroller 750. Microcontroller 750 is programmed to generate a momentary communication prompt for playback or display over display 760 and to receive the EMF typewriter porter signal embedded microcontroller 750 is also programmed to correlate momentary communication state-change signals encoded in the EMF typewriter porter signal with a momentary communication prompt to identify a sensed indicia or command form the EMF change detection signal and to record indicia or characters or execute menu commands in response to the EMF change detection signal. Preferably, self contained EMF typewriter 70 includes a Gauss meter as the sensor for detecting the momentary and localized change in an ambient electromagnetic field.

Alternatively, a mobile device software application or "app", such as an Apple® I-Phone™ app, can be programmed to allow portable media and communication devices to implement an "app" version of the EMF Typewriter system, in accordance with the method of the present invention. While the description specifies the use of an electromagnetic field, other sources of signals can be used with a modified circuit, allowing the use of air pressure, sound, light, or other form of medium to carry a signal.

In addition to the exemplary embodiments illustrated in FIGS. 1-20C, it is possible to employ an "EMF Sensor Switch" configured with EMF sensor 320 and Adaptor 330 to provide a system for sensing spontaneous or localized changes in an electromagnetic field and generating an indication or message in response thereto.

Those having skill in the art will recognize that the structures, apparatus and methods of the present invention make available a system (e.g., 300) for sensing spontaneous or localized changes in an electromagnetic field and generating an indication or message in response thereto, comprising: a sensor (e.g., 320) configured to sense a momentary and localized change in an ambient electromagnetic field and generate an EMF change detection signal in response thereto; an Electromagnetic Peripheral Adapter or EMF typewriter interface circuit (e.g., 330) is preferably configured to detect said EMF change detection signal and generate a selected plurality of momentary communication state-change signals and an EMF typewriter Pointer signal encoded for communication with a computer; a computer programmed to generate momentary communication prompts for playback or display and receive and to receive said EMF typewriter Pointer signal; and wherein said computer is further programmed to correlate a momentary communication state-change signal encoded in said EMF typewriter Pointer signal with a momentary communication prompt to identify a sensed indicia or command from said EMF change detection signal. In the system of the present invention, the computer is preferably also programmed to record indicia or characters or execute menu commands on said computer (e.g., 350).

In addition, it will be appreciated that system 300 provides a mouse or pointer 340 configured to receive said EMF typewriter interface circuit's momentary communication state-change signals and an EMF typewriter Pointer signal, and the mouse further comprises a normally-open "left click" switch 510 which is connected in parallel with said EMF typewriter interface circuit's momentary communication state-change signals and an EMF typewriter Pointer signal, so that computer 350 senses either the mouse's left click switch actuation 510 or the EMF typewriter interface circuit's momentary communication state-change signals and an EMF typewriter Pointer signal, whenever either is in a closed or shorted state.

Persons of skill in the art will also appreciate that the method of the present invention defines a method for sensing and using spontaneous changes in a localized electromagnetic field for communication or remote sensing and comprises the steps of providing a sensor 320 configured to sense a change in an ambient electromagnetic field and generate a change detection signal in response thereto; sensing a momentary and localized change in an ambient electromagnetic field and generating an EMF change detection signal in response thereto; providing an Electromagnetic Peripheral Adapter or EMF typewriter interface circuit 330 configured to detect the EMF change detection signal and generate a selected plurality of momentary communication state-change signals and an EMF typewriter Pointer signal encoded for communication with a computer 350; detecting said EMF change detection signal and generating a selected plurality of momentary communication state-change signals and an EMF typewriter Pointer signal encoded for communication with computer 350. The method further comprises the method steps of programming computer 350 as illustrated in FIG. 10's process flow diagram to generate momentary communication prompts for playback or display and receive and to receive said EMF typewriter Pointer signal as shown in FIGS. 11-13; generating momentary communication prompts for playback or display; receiving said EMF typewriter Pointer signal; and correlating a momentary communication state-change signal encoded in said EMF typewriter Pointer signal with a momentary communication prompt and then identifying a sensed indicia or command from said EMF change detection signal and then either recording the indicia or characters or executing menu commands on computer 350 in response to the EMF change detection signal. In the method illustrated in FIGS. 10-14, a selected first indicia from a plurality of indicia (e.g., characters or commands) is displayed for a selected delay interval, and if no EMF field change is sensed, the program selects a second of said plurality of said indicia are characters or commands and displays the second indicia for a selected delay or prompting interval. During the display prompting interval, the system senses whether an EMF field is present or whether an EMF change is sensed during the display interval of said second indicia. The displayed sequence (e.g., as shown in FIGS. 11-13) can be controlled manually or a rotating sequence can be displayed continuously until stopped.

Having described preferred embodiments of a new and improved system and method, it is believed that other modifications, variations and changes will be suggested to those skilled in the art in view of the teachings set forth herein. It is therefore to be understood that all such variations, modifications and changes are believed to fall within the scope of the present invention, as set forth in the following claims.

What is claimed is:

1. A system for sensing and detecting spontaneous or localized changes in an electromagnetic field and generating an indication or message in response thereto, comprising:
   (a) a sensor configured to sense and detect a momentary and localized change in an ambient electromagnetic field and generate an Electro-Magnetic Field change detection signal in response thereto;
   (b) an Electromagnetic Peripheral Adapter or Electro-Magnetic Field typewriter interface circuit configured to detect said Electro-Magnetic Field change detection signal and generate a selected plurality of momentary communication state-change signals and an Electro-Magnetic Field typewriter Pointer signal encoded for communication with a computer;
   (c) a computer programmed to generate momentary communication prompts for playback or display and to receive said Electro-Magnetic Field typewriter Pointer signal in response to detecting said momentary and localized change; and
   (d) wherein said computer is further programmed to correlate a momentary communication state-change signal encoded in said Electro-Magnetic Field typewriter Pointer signal with a momentary communication prompt to identify a sensed indicia or command from said Electro-Magnetic Field change detection signal.

2. The system of claim 1, wherein said computer is further programmed to record indicia or characters or execute menu commands on said computer.

3. The system of claim 1, wherein said sensor is a gauss meter.

4. The system of claim 1, wherein said Electro-Magnetic Field typewriter interface circuit configured to detect said Electro-Magnetic Field change detection signal comprises a voltage inverter and a voltage amplifier adapted to invert and amplify said Electro-Magnetic Field change detection signal which is then input to a thresholding circuit.

5. The system of claim 1, wherein said Electro-Magnetic Field typewriter interface circuit's thresholding circuit comprises a monostable multivibrator configured to generate said momentary communication state-change signals and an Electro-Magnetic Field typewriter Pointer signal.

6. The system of claim 1, further comprising a mouse or pointer configured to receive said Electro-Magnetic Field typewriter interface circuit's momentary communication state-change signals and an EMF typewriter Pointer signal, and wherein said mouse further comprises a normally open "left click" switch which is connected in parallel with said Electro-Magnetic Field typewriter interface circuit's momentary communication state-change signals and an Electro-Magnetic Field typewriter Pointer signal, so that said computer senses either the mouse's left click switch actuation or said Electro-Magnetic Field typewriter interface circuit's momentary communication state-change signals and an Electro-Magnetic Field typewriter Pointer signal whenever either is in a closed or shorted state.

7. A method for sensing, detecting and using spontaneous changes in a localized electromagnetic field, comprising:
   (a) providing a sensor configured to sense and detect a change in an ambient electromagnetic field and generate a change detection signal in response thereto;
   (b) sensing a momentary and localized change in an ambient electromagnetic field and (c) generating an Electro-Magnetic Field change detection signal in response thereto;
   (d) providing an Electromagnetic Peripheral Adapter or Electro-Magnetic Field typewriter interface circuit configured to detect the Electro-Magnetic Field change detection signal and generate a selected plurality of momentary communication state-change signals and an Electro-Magnetic Field typewriter Pointer signal encoded for communication with a computer;
   (e) detecting said Electro-Magnetic Field change detection signal and generating a selected plurality of momentary communication state-change signals and an Electro-Magnetic Field typewriter Pointer signal encoded for communication with a computer.

8. The method of claim 7, further comprising the method steps of
   (f) providing a computer programmed to generate momentary communication prompts for playback or display and receive and to receive said Electro-Magnetic Field typewriter Pointer signal;
   (g) generating momentary communication prompts for playback or display;
   (h) receiving said Electro-Magnetic Field typewriter Pointer signal; and
   (i) correlating a momentary communication state-change signal encoded in said Electro-Magnetic Field typewriter Pointer signal with a momentary communication prompt and then
   (j) identifying a sensed indicia or command from said Electro-Magnetic Field change detection signal.

9. The method of claim 8, further comprising the method step of:
   (k) either recording indicia or characters or
      executing menu commands on said computer in response to said Electro-Magnetic Field change detection signal.

10. The method of claim 9, wherein a selected first of a plurality of said indicia are characters or commands displayed for a selected delay interval.

11. The method of claim 10, further comprising
   (l) selecting a second of said plurality of said indicia are characters or commands and
   (m) displaying said second indicia for a selected delay interval, and
   (n) sensing whether an Electro-Magnetic Field field is present during the display interval of said second indicia.

12. A system for sensing and detecting spontaneous or localized changes in an electromagnetic field and generating an indication or message in response thereto, comprising:
   (a) a sensor configured to sense and detect a momentary and localized change in an ambient electromagnetic field and generate an Electro-Magnetic Field change detection signal in response thereto spontaneously, wherein said sensor has at least four pre-defined Electro-Magnetic Field threshold levels;

(b) an Electromagnetic Peripheral Adapter or Electro-Magnetic Field typewriter interface circuit configured to receive and process said Electro-Magnetic Field change detection signal and generate a selected plurality of momentary communication state-change signals encoded within an Electro-Magnetic Field typewriter Pointer signal encoded for communication with a computer;

(c) a computer programmed to receive said Electro-Magnetic Field typewriter Pointer signal and generate momentary communication prompts for playback or display in response to detecting said momentary and localized change; and (d) wherein said computer is further programmed to correlate a momentary communication state-change signal encoded in said Electro-Magnetic Field typewriter Pointer signal with a momentary communication prompt to identify a sensed indicia or command from said Electro-Magnetic Field change detection signal.

13. A method for sensing, detecting and using spontaneous changes in a localized electromagnetic field, comprising:

(a) providing a sensor configured to sense and detect change in an ambient electromagnetic field and generate a change detection signal in response thereto;

(b) configuring said sensor by selecting a detection threshold level from at least four pre-defined Electro-Magnetic Field threshold levels;

(c) sensing a momentary and localized change in an ambient electromagnetic field spontaneously and (d) generating an Electro-Magnetic Field change detection signal in response thereto;

(e) providing an Electromagnetic Peripheral Adapter or Electro-Magnetic Field typewriter interface circuit configured to detect the Electro-Magnetic Field change detection signal and generate a selected plurality of momentary communication state-change signals and an Electro-Magnetic Field typewriter Pointer signal encoded for communication with a computer;

(f) detecting said Electro-Magnetic Field change detection signal and generating a selected plurality of momentary communication state-change signals and an Electro-Magnetic Field typewriter Pointer signal encoded for communication with a computer;

(g) providing a computer programmed to generate momentary communication prompts for playback or display and receive and to receive said Electro-Magnetic Field typewriter Pointer signal;

(h) generating momentary communication prompts for playback or display;

(i) receiving said Electro-Magnetic Field typewriter Pointer signal; and (j) correlating a momentary communication state-change signal encoded in said Electro-Magnetic Field typewriter Pointer signal with a momentary communication prompt and then (k) identifying a sensed indicia or command from said Electro-Magnetic Field change detection signal.

* * * * *